United States Patent
Bonalle et al.

(10) Patent No.: US 7,463,133 B2
(45) Date of Patent: Dec. 9, 2008

(54) SYSTEMS AND METHODS FOR PROVIDING A RF TRANSACTION DEVICE OPERABLE TO STORE MULTIPLE DISTINCT CALLING CARD ACCOUNTS

(75) Inventors: David S. Bonalle, New Rochelle, NY (US); Jeff Fehlhaber, Glendale, AZ (US); Peter D. Saunders, Salt Lake City, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 428 days.

(21) Appl. No.: 10/810,469

(22) Filed: Mar. 27, 2004

(65) Prior Publication Data

US 2005/0004866 A1    Jan. 6, 2005

Related U.S. Application Data

(63) Continuation-in-part of application No. 10/608,792, filed on Jun. 27, 2003, which is a continuation-in-part of application No. 10/435,420, filed on May 9, 2003, which is a continuation-in-part of application No. 10/340,352, filed on Jan. 10, 2003, which is a continuation-in-part of application No. 10/192,488, filed on Jul. 9, 2002, now Pat. No. 7,239,226.

(60) Provisional application No. 60/304,216, filed on Jul. 10, 2001, provisional application No. 60/396,577, filed on Jul. 16, 2002.

(51) Int. Cl.
  *G05B 19/00* (2006.01)
  *G06F 7/00* (2006.01)
  *H04B 1/00* (2006.01)

(52) U.S. Cl. .................. 340/5.61; 340/10.1; 340/10.51; 340/5.21

(58) Field of Classification Search ................ 340/5.61, 340/10.1, 10.51, 10.31, 5.21, 5.4; 235/379, 235/380–381, 487; 379/357.01, 355.04, 379/114; 455/558; 711/115; 705/39–44, 705/16, 26; 707/6, 8
See application file for complete search history.

(56) References Cited

U.S. PATENT DOCUMENTS 4,303,904 A    12/1981    Chasek (Continued)

FOREIGN PATENT DOCUMENTS

CH    689070    8/1988

(Continued)

OTHER PUBLICATIONS

"What's New: Timex Watch Features Speedpass System", http://www.speedpass.com/news/article.jsp?id=51 (1 page).

(Continued)

*Primary Examiner*—Brian Zimmerman
*Assistant Examiner*—Nam V Nguyen
(74) *Attorney, Agent, or Firm*—Fitzpatrick, Cella, Harper & Scinto

(57) ABSTRACT

A RF transaction device stores multiple distinct calling card accounts associated with a calling card account. The multiple calling card accounts may be issued by multiple calling card carriers. An RF operable reader is in communication with a telephonic call enabling device. The RF transaction device communicates with the reader to retrieve calling card account information. Since the RF device has multiple distinct credit card account numbers stored on the transaction device, the RF transaction device may be used to effectuate a calling card call on different call carrier systems using differently formatted call authorizing systems.

7 Claims, 14 Drawing Sheets

U.S. PATENT DOCUMENTS

| | | |
|---|---|---|
| 4,443,027 A | 4/1984 | McNeely et al. |
| 4,450,535 A | 5/1984 | de Pommery et al. |
| 4,475,308 A | 10/1984 | Heise et al. |
| 4,583,766 A | 4/1986 | Wessel |
| 4,639,765 A | 1/1987 | dHont |
| 4,672,021 A | 6/1987 | Blumel et al. |
| 4,700,055 A | 10/1987 | Kashkashian, Jr. |
| 4,736,094 A | 4/1988 | Yoshida |
| 4,739,328 A | 4/1988 | Koelle et al. |
| 4,837,422 A | 6/1989 | Dethloff et al. |
| 4,839,504 A | 6/1989 | Nakano |
| 4,868,849 A * | 9/1989 | Tamaoki ............... 379/357.01 |
| 4,961,142 A | 10/1990 | Elliott et al. |
| 5,016,274 A | 5/1991 | Micali et al. |
| 5,023,782 A | 6/1991 | Lutz et al. |
| 5,023,908 A | 6/1991 | Weiss |
| 5,025,372 A | 6/1991 | Burton et al. |
| 5,053,774 A | 10/1991 | Schuermann et al. |
| 5,099,226 A | 3/1992 | Andrews |
| 5,101,200 A | 3/1992 | Swett |
| 5,197,140 A | 3/1993 | Balmer |
| 5,202,826 A | 4/1993 | McCarthy |
| 5,212,777 A | 5/1993 | Gove et al. |
| 5,221,838 A | 6/1993 | Gutman et al. |
| 5,222,282 A | 6/1993 | Sukonnik et al. |
| 5,226,989 A | 7/1993 | Sukonnik |
| 5,239,654 A | 8/1993 | Ing-Simmons et al. |
| 5,247,304 A | 9/1993 | dHont |
| 5,274,392 A | 12/1993 | dHont et al. |
| 5,276,311 A | 1/1994 | Hennige |
| 5,285,100 A | 2/1994 | Byatt |
| 5,305,002 A | 4/1994 | Holodak et al. |
| 5,326,964 A | 7/1994 | Risser |
| 5,329,617 A | 7/1994 | Asai |
| 5,331,138 A | 7/1994 | Saroya |
| 5,339,447 A | 8/1994 | Balmer |
| 5,349,357 A | 9/1994 | Schurmann et al. |
| 5,350,906 A | 9/1994 | Brody et al. |
| 5,351,052 A | 9/1994 | dHont et al. |
| 5,365,551 A | 11/1994 | Snodgrass et al. |
| 5,371,896 A | 12/1994 | Gove et al. |
| 5,373,303 A | 12/1994 | dHont |
| 5,397,881 A | 3/1995 | Mannik |
| 5,407,893 A | 4/1995 | Koshizuka et al. |
| 5,408,243 A | 4/1995 | dHont |
| 5,410,649 A | 4/1995 | Gove |
| 5,428,363 A | 6/1995 | dHont |
| 5,453,601 A | 9/1995 | Rosen |
| 5,453,747 A | 9/1995 | dHont et al. |
| 5,461,217 A | 10/1995 | Claus |
| 5,471,592 A | 11/1995 | Gove et al. |
| 5,485,510 A | 1/1996 | Colbert |
| 5,488,376 A | 1/1996 | Hurta et al. |
| 5,489,411 A | 2/1996 | Jha et al. |
| 5,489,908 A | 2/1996 | Orthmann et al. |
| 5,490,079 A | 2/1996 | Sharpe et al. |
| 5,491,483 A | 2/1996 | dHont |
| 5,491,484 A | 2/1996 | Schuermann |
| 5,491,715 A | 2/1996 | Flaxl |
| 5,493,312 A | 2/1996 | Knebelkamp |
| 5,497,121 A | 3/1996 | dHont |
| 5,500,513 A | 3/1996 | Langhans et al. |
| 5,500,651 A | 3/1996 | Schuermann |
| 5,504,808 A | 4/1996 | Hamrick, Jr. |
| 5,513,525 A | 5/1996 | Schurmann |
| 5,519,381 A | 5/1996 | Marsh et al. |
| 5,522,083 A | 5/1996 | Gove et al. |
| 5,525,992 A | 6/1996 | Froschermeier |
| 5,525,994 A | 6/1996 | Hurta et al. |
| 5,530,232 A | 6/1996 | Taylor |
| 5,537,314 A | 7/1996 | Kanter |
| 5,541,604 A | 7/1996 | Meier |
| 5,543,798 A | 8/1996 | Schuermann |
| 5,544,246 A | 8/1996 | Mandelbaum et al. |
| 5,548,291 A | 8/1996 | Meier et al. |
| 5,550,536 A | 8/1996 | Flaxl |
| 5,550,548 A | 8/1996 | Schuermann |
| 5,552,789 A | 9/1996 | Schuermann |
| 5,557,279 A | 9/1996 | dHont |
| 5,557,516 A | 9/1996 | Hogan |
| 5,561,430 A | 10/1996 | Knebelkamp |
| 5,563,582 A | 10/1996 | dHont |
| 5,569,187 A | 10/1996 | Kaiser |
| 5,572,226 A | 11/1996 | Tuttle |
| 5,577,109 A | 11/1996 | Stimson et al. |
| 5,577,120 A | 11/1996 | Penzias |
| 5,578,808 A | 11/1996 | Taylor |
| 5,581,630 A | 12/1996 | Bonneau, Jr. |
| 5,585,787 A | 12/1996 | Wallerstein |
| 5,590,038 A | 12/1996 | Pitroda |
| 5,592,150 A | 1/1997 | dHont |
| 5,592,405 A | 1/1997 | Gove et al. |
| 5,594,227 A | 1/1997 | Deo |
| 5,594,233 A | 1/1997 | Kenneth et al. |
| 5,594,448 A | 1/1997 | dHont |
| 5,597,534 A | 1/1997 | Kaiser |
| 5,600,175 A | 2/1997 | Orthmann |
| 5,602,538 A | 2/1997 | Orthmann et al. |
| 5,602,919 A | 2/1997 | Hurta et al. |
| 5,604,342 A | 2/1997 | Fujioka |
| 5,606,520 A | 2/1997 | Gove et al. |
| 5,606,594 A | 2/1997 | Register et al. |
| 5,607,522 A | 3/1997 | McDonnell |
| 5,608,406 A | 3/1997 | Eberth et al. |
| 5,608,778 A | 3/1997 | Partridge, III |
| 5,613,146 A | 3/1997 | Gove et al. |
| 5,614,703 A | 3/1997 | Martin et al. |
| 5,619,207 A | 4/1997 | dHont |
| 5,621,396 A | 4/1997 | Flaxl |
| 5,621,411 A | 4/1997 | Hagl et al. |
| 5,621,412 A | 4/1997 | Sharpe et al. |
| 5,625,366 A | 4/1997 | dHont |
| 5,625,370 A | 4/1997 | dHont |
| 5,625,695 A | 4/1997 | MRaihi et al. |
| 5,629,981 A | 5/1997 | Nerlikar |
| 5,638,080 A | 6/1997 | Orthmann et al. |
| 5,640,002 A | 6/1997 | Ruppert et al. |
| 5,641,050 A | 6/1997 | Smith et al. |
| 5,646,607 A | 7/1997 | Schurmann et al. |
| 5,649,118 A | 7/1997 | Carlisle et al. |
| 5,657,388 A | 8/1997 | Weiss |
| 5,660,319 A | 8/1997 | Falcone et al. |
| 5,673,106 A | 9/1997 | Thompson |
| 5,675,342 A | 10/1997 | Sharpe |
| 5,686,920 A | 11/1997 | Hurta et al. |
| 5,689,100 A | 11/1997 | Carrithers et al. |
| 5,691,731 A | 11/1997 | vanErven |
| 5,692,132 A | 11/1997 | Hogan |
| 5,696,913 A | 12/1997 | Gove et al. |
| 5,698,837 A | 12/1997 | Furuta |
| 5,699,528 A | 12/1997 | Hogan |
| 5,701,127 A | 12/1997 | Sharpe |
| 5,704,046 A | 12/1997 | Hogan |
| 5,705,798 A | 1/1998 | Tarbox |
| 5,715,399 A | 2/1998 | Bezos |
| 5,721,781 A | 2/1998 | Deo et al. |
| 5,724,424 A | 3/1998 | Gifford |
| 5,729,053 A | 3/1998 | Orthmann |
| 5,729,236 A | 3/1998 | Flaxl |
| 5,731,957 A | 3/1998 | Brennan |
| 5,732,579 A | 3/1998 | dHont et al. |
| 5,734,838 A | 3/1998 | Robinson et al. |
| 5,742,756 A | 4/1998 | Dillaway et al. |
| 5,742,845 A | 4/1998 | Wagner |

| | | | | | |
|---|---|---|---|---|---|
| 5,748,137 A | 5/1998 | dHont | 5,915,023 A | 6/1999 | Bernstein |
| 5,748,737 A | 5/1998 | Daggar | 5,917,168 A | 6/1999 | Nakamura et al. |
| 5,758,195 A | 5/1998 | Balmer | 5,918,216 A | 6/1999 | Miksovsky et al. |
| 5,761,306 A | 6/1998 | Lewis | 5,920,628 A | 7/1999 | Indeck et al. |
| 5,761,493 A | 6/1998 | Blakeley et al. | 5,923,734 A | 7/1999 | Taskett |
| 5,768,385 A | 6/1998 | Simon | 5,929,801 A | 7/1999 | Aslanidis et al. |
| 5,768,609 A | 6/1998 | Gove et al. | 5,930,767 A | 7/1999 | Reber et al. |
| 5,770,843 A | 6/1998 | Rose et al. | 5,930,777 A | 7/1999 | Barber |
| 5,774,882 A | 6/1998 | Keen et al. | 5,931,917 A | 8/1999 | Nguyen et al. |
| 5,777,903 A | 7/1998 | Piosenka et al. | 5,933,624 A | 8/1999 | Balmer |
| 5,778,067 A | 7/1998 | Jones et al. | 5,943,624 A | 8/1999 | Fox et al. |
| 5,778,069 A | 7/1998 | Thomlinson et al. | 5,948,116 A | 9/1999 | Aslanidis et al. |
| 5,785,680 A | 7/1998 | Niezink et al. | 5,949,044 A | 9/1999 | Walker et al. |
| 5,792,337 A | 8/1998 | Padovani et al. | 5,949,876 A | 9/1999 | Ginter et al. |
| 5,793,324 A | 8/1998 | Aslanidis et al. | 5,953,512 A | 9/1999 | Cai et al. |
| 5,794,095 A | 8/1998 | Thompson | 5,953,710 A | 9/1999 | Fleming |
| 5,797,060 A | 8/1998 | Thompson | 5,955,717 A | 9/1999 | Vanstone |
| 5,797,085 A | 8/1998 | Beuk et al. | 5,955,969 A | 9/1999 | dHont |
| 5,797,133 A | 8/1998 | Jones et al. | 5,956,024 A | 9/1999 | Strickland et al. |
| 5,798,709 A | 8/1998 | Flaxl | 5,956,699 A | 9/1999 | Wong et al. |
| 5,809,142 A | 9/1998 | Hurta et al. | 5,958,004 A | 9/1999 | Helland et al. |
| 5,809,288 A | 9/1998 | Balmer | 5,960,411 A | 9/1999 | Hartman et al. |
| 5,809,633 A | 9/1998 | Mundigl et al. | 5,963,915 A | 10/1999 | Kirsch |
| 5,825,007 A | 10/1998 | Jesadanont | 5,963,924 A | 10/1999 | Williams et al. |
| 5,825,302 A | 10/1998 | Stafford | 5,966,697 A | 10/1999 | Fergerson et al. |
| 5,826,077 A | 10/1998 | Blakeley et al. | 5,970,148 A | 10/1999 | Meier |
| 5,826,241 A | 10/1998 | Stein et al. | 5,970,471 A | 10/1999 | Hill |
| 5,826,242 A | 10/1998 | Montulli | 5,970,472 A | 10/1999 | Allsop et al. |
| 5,826,243 A | 10/1998 | Musmanno et al. | 5,970,473 A | 10/1999 | Gerszberg et al. |
| 5,828,044 A | 10/1998 | Jun et al. | 5,970,475 A | 10/1999 | Barnes et al. |
| 5,834,756 A | 11/1998 | Gutman et al. | RE36,365 E | 11/1999 | Levine et al. |
| 5,835,894 A | 11/1998 | Adcock et al. | 5,978,840 A | 11/1999 | Nguyen et al. |
| 5,841,364 A | 11/1998 | Hagl et al. | 5,979,757 A | 11/1999 | Tracy et al. |
| 5,842,088 A | 11/1998 | Thompson | 5,982,293 A | 11/1999 | Everett et al. |
| 5,844,218 A | 12/1998 | Kawan et al. | 5,983,207 A | 11/1999 | Turk et al. |
| 5,844,230 A | 12/1998 | Lalonde | 5,983,208 A | 11/1999 | Haller et al. |
| 5,845,267 A | 12/1998 | Ronen | 5,987,140 A | 11/1999 | Rowney et al. |
| 5,851,149 A | 12/1998 | Xidos et al. | 5,987,155 A | 11/1999 | Dunn et al. |
| 5,852,812 A | 12/1998 | Reeder | 5,987,498 A | 11/1999 | Athing et al. |
| 5,854,891 A | 12/1998 | Postlewaite et al. | 5,989,950 A | 11/1999 | Wu |
| 5,858,006 A | 1/1999 | Van der AA et al. | 5,991,413 A | 11/1999 | Arditti et al. |
| 5,859,419 A | 1/1999 | Wynn | 5,991,608 A | 11/1999 | Leyten |
| 5,859,779 A | 1/1999 | Giordano et al. | 5,991,748 A | 11/1999 | Taskett |
| 5,862,325 A | 1/1999 | Reed et al. | 5,991,750 A | 11/1999 | Watson |
| 5,864,306 A | 1/1999 | Dwyer et al. | 5,996,076 A | 11/1999 | Rowney et al. |
| 5,864,323 A | 1/1999 | Berthon | 5,999,914 A | 12/1999 | Blinn et al. |
| 5,864,830 A | 1/1999 | Armetta et al. | 6,000,832 A | 12/1999 | Franklin et al. |
| 5,867,100 A | 2/1999 | dHont | 6,002,438 A | 12/1999 | Hocevar et al. |
| 5,870,031 A | 2/1999 | Kaiser et al. | 6,002,767 A | 12/1999 | Kramer |
| 5,870,915 A | 2/1999 | dHont | 6,003,014 A | 12/1999 | Lee et al. |
| 5,878,138 A | 3/1999 | Yacobi | 6,005,942 A | 12/1999 | Chan et al. |
| 5,878,141 A | 3/1999 | Daly et al. | 6,006,216 A | 12/1999 | Griffin et al. |
| 5,878,215 A | 3/1999 | Kling et al. | 6,009,412 A | 12/1999 | Storey |
| 5,878,337 A | 3/1999 | Joao et al. | 6,011,487 A | 1/2000 | Plocher |
| 5,878,403 A | 3/1999 | DeFrancesco et al. | 6,012,039 A | 1/2000 | Hoffman et al. |
| 5,880,675 A | 3/1999 | Trautner | 6,012,049 A | 1/2000 | Kawan |
| 5,881,272 A | 3/1999 | Balmer | 6,012,143 A | 1/2000 | Tanaka |
| 5,883,810 A | 3/1999 | Franklin et al. | 6,012,636 A | 1/2000 | Smith |
| 5,884,280 A | 3/1999 | Yoshioka et al. | 6,014,634 A | 1/2000 | Scroggie et al. |
| 5,887,266 A | 3/1999 | Heinonen et al. | 6,014,635 A | 1/2000 | Harris et al. |
| 5,890,137 A | 3/1999 | Koreeda | 6,014,636 A | 1/2000 | Reeder |
| 5,897,622 A | 4/1999 | Blinn et al. | 6,014,645 A | 1/2000 | Cunningham |
| 5,898,783 A | 4/1999 | Rohrbach | 6,014,646 A | 1/2000 | Vallee et al. |
| 5,898,838 A | 4/1999 | Wagner | 6,014,648 A | 1/2000 | Brennan |
| 5,903,830 A | 5/1999 | Joao et al. | 6,014,650 A | 1/2000 | Zampese |
| 5,903,875 A | 5/1999 | Kohara | 6,014,748 A | 1/2000 | Tushi et al. |
| 5,903,880 A | 5/1999 | Biffar | 6,016,482 A | 1/2000 | Molinari et al. |
| 5,905,798 A | 5/1999 | Nerlikar et al. | 6,016,484 A * | 1/2000 | Williams et al. .............. 705/39 |
| 5,905,908 A | 5/1999 | Wagner | 6,018,717 A | 1/2000 | Lee et al. |
| 5,909,492 A | 6/1999 | Payne et al. | 6,018,718 A | 1/2000 | Walker et al. |
| 5,912,678 A | 6/1999 | Saxena et al. | 6,021,943 A | 2/2000 | Chastain |
| 5,913,203 A | 6/1999 | Wong et al. | 6,023,510 A | 2/2000 | Epstein |
| 5,914,472 A | 6/1999 | Foladare et al. | 6,024,286 A | 2/2000 | Bradley et al. |

| | | | | | | |
|---|---|---|---|---|---|---|
| 6,029,147 | A | 2/2000 | Horadan et al. | 6,205,151 | B1 | 3/2001 | Quay et al. |
| 6,029,149 | A | 2/2000 | Dykstra et al. | 6,206,293 | B1 | 3/2001 | Gutman et al. |
| 6,029,150 | A | 2/2000 | Kravitz | 6,213,390 | B1 | 4/2001 | Oneda |
| 6,029,890 | A | 2/2000 | Austin | 6,215,437 | B1 | 4/2001 | Schurmann et al. |
| 6,029,892 | A | 2/2000 | Miyake | 6,216,219 | B1 | 4/2001 | Cai et al. |
| 6,032,136 | A | 2/2000 | Brake et al. | 6,219,439 | B1 | 4/2001 | Burger |
| 6,038,292 | A | 3/2000 | Thomas | 6,220,510 | B1 | 4/2001 | Everett et al. |
| 6,038,551 | A | 3/2000 | Barlow et al. | 6,222,914 | B1 | 4/2001 | McMullin |
| 6,038,584 | A | 3/2000 | Balmer | D442,627 | S | 5/2001 | Webb et al. |
| 6,041,308 | A | 3/2000 | Walker et al. | D442,629 | S | 5/2001 | Webb et al. |
| 6,044,360 | A | 3/2000 | Picciallo | 6,223,984 | B1 | 5/2001 | Renner et al. |
| 6,047,888 | A | 4/2000 | Dethloff | 6,226,382 | B1 | 5/2001 | MRaihi et al. |
| 6,052,675 | A | 4/2000 | Checchio | 6,227,447 | B1 | 5/2001 | Campisano |
| 6,058,418 | A | 5/2000 | Kobata | 6,230,270 | B1 | 5/2001 | Laczko, Sr. |
| 6,061,344 | A | 5/2000 | Wood, Jr. | 6,232,917 | B1 | 5/2001 | Baumer et al. |
| 6,061,789 | A | 5/2000 | Hauser et al. | 6,233,683 | B1 | 5/2001 | Chan et al. |
| 6,064,320 | A | 5/2000 | dHont et al. | 6,237,848 | B1 | 5/2001 | Everett |
| 6,064,981 | A | 5/2000 | Barni et al. | 6,239,675 | B1 | 5/2001 | Flaxl |
| 6,070,003 | A | 5/2000 | Gove et al. | 6,240,187 | B1 | 5/2001 | Lewis |
| 6,070,150 | A | 5/2000 | Remington et al. | 6,248,199 | B1 | 6/2001 | Smulson |
| 6,070,154 | A | 5/2000 | Tavor et al. | 6,257,486 | B1 | 7/2001 | Teicher et al. |
| 6,072,870 | A | 6/2000 | Nguyen et al. | 6,259,769 | B1 | 7/2001 | Page |
| 6,073,840 | A | 6/2000 | Marion | 6,260,026 | B1 | 7/2001 | Tomida et al. |
| 6,076,078 | A | 6/2000 | Camp et al. | 6,260,088 | B1 | 7/2001 | Gove et al. |
| 6,078,888 | A | 6/2000 | Johnson, Jr. | 6,263,316 | B1 | 7/2001 | Khan et al. |
| 6,078,906 | A | 6/2000 | Huberman | 6,264,106 | B1 | 7/2001 | Bridgelall |
| 6,078,908 | A | 6/2000 | Schmitz | 6,266,754 | B1 | 7/2001 | Laczko, Sr. et al. |
| 6,081,790 | A | 6/2000 | Rosen | 6,267,292 | B1 | 7/2001 | Walker et al. |
| RE36,788 | E | 7/2000 | Mansvelt et al. | 6,269,348 | B1 | 7/2001 | Pare et al. |
| 6,088,683 | A | 7/2000 | Jalili | 6,273,335 | B1 | 8/2001 | Sloan |
| 6,088,686 | A | 7/2000 | Walker et al. | 6,282,522 | B1 | 8/2001 | Davis et al. |
| 6,088,717 | A | 7/2000 | Reed et al. | D447,515 | S | 9/2001 | Faenza, Jr. et al. |
| 6,088,797 | A | 7/2000 | Rosen | 6,286,763 | B1 | 9/2001 | Reynolds et al. |
| 6,092,057 | A | 7/2000 | Zimmerman et al. | 6,289,324 | B1 | 9/2001 | Kawan |
| 6,092,198 | A | 7/2000 | Lanzy et al. | 6,293,462 | B1 | 9/2001 | Gangi |
| 6,098,053 | A | 8/2000 | Slater | 6,315,193 | B1 | 11/2001 | Hogan |
| 6,098,879 | A | 8/2000 | Terranova | 6,315,195 | B1 | 11/2001 | Ramachandran |
| 6,101,174 | A | 8/2000 | Langston | 6,317,721 | B1 | 11/2001 | Hurta et al. |
| 6,102,162 | A | 8/2000 | Teicher | 6,318,636 | B1 | 11/2001 | Reynolds et al. |
| 6,102,672 | A | 8/2000 | Woollenweber | 6,323,566 | B1 | 11/2001 | Meier |
| 6,105,008 | A | 8/2000 | Davis et al. | 6,325,285 | B1 | 12/2001 | Baratelli |
| 6,105,013 | A | 8/2000 | Curry et al. | 6,325,293 | B1 | 12/2001 | Moreno |
| 6,105,865 | A | 8/2000 | Hardesty | 6,326,934 | B1 | 12/2001 | Kinzie |
| 6,108,641 | A | 8/2000 | Kenna et al. | 6,327,573 | B1 | 12/2001 | Walker et al. |
| 6,109,525 | A | 8/2000 | Blomqvist et al. | 6,330,544 | B1 | 12/2001 | Walker et al. |
| 6,112,152 | A | 8/2000 | Tuttle | 6,336,095 | B1 | 1/2002 | Rosen |
| 6,112,191 | A | 8/2000 | Burke | 6,342,844 | B1 | 1/2002 | Rozin |
| 6,115,360 | A | 9/2000 | Quay et al. | 6,353,811 | B1 | 3/2002 | Weissman |
| 6,115,458 | A | 9/2000 | Taskett | 6,364,208 | B1 | 4/2002 | Stanford et al. |
| 6,116,423 | A | 9/2000 | Troxtell, Jr. et al. | 6,367,011 | B1 | 4/2002 | Lee et al. |
| 6,116,505 | A | 9/2000 | Withrow | 6,374,245 | B1 | 4/2002 | Park |
| 6,118,189 | A | 9/2000 | Flaxl | 6,377,034 | B1 | 4/2002 | Ivanov |
| 6,121,544 | A | 9/2000 | Petsinger | 6,378,073 | B1 | 4/2002 | Davis et al. |
| 6,122,625 | A | 9/2000 | Rosen | 6,388,533 | B2 | 5/2002 | Swoboda |
| 6,123,223 | A | 9/2000 | Watkins | 6,390,375 | B2 | 5/2002 | Kayanakis |
| 6,125,352 | A | 9/2000 | Franklin et al. | 6,400,272 | B1 | 6/2002 | Holtzman et al. |
| 6,129,274 | A | 10/2000 | Suzuki | 6,402,026 | B1 | 6/2002 | Schwier |
| 6,133,834 | A | 10/2000 | Eberth et al. | 6,402,028 | B1 | 6/2002 | Graham, Jr. et al. |
| 6,141,651 | A | 10/2000 | Riley et al. | 6,411,611 | B1 | 6/2002 | Van der Tuijn |
| 6,141,752 | A | 10/2000 | Dancs et al. | 6,415,978 | B1 | 7/2002 | McAllister |
| 6,163,771 | A | 12/2000 | Walker et al. | 6,422,464 | B1 | 7/2002 | Terranova |
| 6,167,236 | A | 12/2000 | Kaiser et al. | 6,422,532 | B1 | 7/2002 | Garner |
| 6,173,269 | B1 | 1/2001 | Sokol et al. | 6,424,029 | B1 | 7/2002 | Giesler |
| 6,173,272 | B1 | 1/2001 | Thomas et al. | RE37,822 | E | 8/2002 | Anthonyson |
| 6,177,860 | B1 | 1/2001 | Cromer et al. | 6,427,910 | B1 | 8/2002 | Barnes et al. |
| 6,179,205 | B1 | 1/2001 | Sloan | 6,438,235 | B2 | 8/2002 | Sims, III |
| 6,179,206 | B1 | 1/2001 | Matsumori | 6,439,455 | B1 | 8/2002 | Everett et al. |
| 6,188,994 | B1 | 2/2001 | Egendorf | 6,445,794 | B1 | 9/2002 | Shefi |
| 6,189,787 | B1 | 2/2001 | Dorf | 6,457,996 | B1 | 10/2002 | Shih |
| 6,192,255 | B1 | 2/2001 | Lewis et al. | 6,466,804 | B1 | 10/2002 | Pecen et al. |
| 6,198,728 | B1 | 3/2001 | Hulyalkar et al. | 6,473,500 | B1 | 10/2002 | Risafi et al. |
| 6,198,875 | B1 | 3/2001 | Edenson et al. | 6,480,100 | B1 | 11/2002 | Frieden et al. |
| 6,202,927 | B1 | 3/2001 | Bashan et al. | 6,480,101 | B1 | 11/2002 | Kelly et al. |

| | | | | | |
|---|---|---|---|---|---|
| 6,481,621 B1 | 11/2002 | Herrendoerfer et al. | 2001/0034565 A1 | 10/2001 | Leatherman |
| 6,481,632 B2 | 11/2002 | Wentker et al. | 2001/0034720 A1 | 10/2001 | Armes |
| 6,483,427 B1 | 11/2002 | Werb | 2001/0039617 A1 | 11/2001 | Buhrlen et al. |
| 6,483,477 B1 | 11/2002 | Plonka | 2001/0049628 A1 | 12/2001 | Icho |
| 6,483,929 B1 | 11/2002 | Murakami et al. | 2002/0011519 A1 | 1/2002 | Shults |
| 6,484,937 B1 | 11/2002 | Devaux et al. | 2002/0026419 A1 | 2/2002 | Maritzen et al. |
| 6,490,443 B1 | 12/2002 | Freeny, Jr. | 2002/0028704 A1 | 3/2002 | Bloomfield et al. |
| 6,491,229 B1 | 12/2002 | Berney | 2002/0035548 A1 | 3/2002 | Hogan et al. |
| 6,494,380 B2 | 12/2002 | Jarosz | 2002/0046341 A1 | 4/2002 | Kazaks et al. |
| 6,507,762 B1 | 1/2003 | Amro et al. | 2002/0052839 A1 | 5/2002 | Takatori |
| 6,510,983 B2 | 1/2003 | Horowitz et al. | 2002/0062284 A1 | 5/2002 | Kawan |
| 6,510,998 B1 | 1/2003 | Stanford et al. | 2002/0074398 A1 | 6/2002 | Lancos et al. |
| 6,513,015 B2 | 1/2003 | Ogasawara | 2002/0077837 A1 | 6/2002 | Krueger et al. |
| 6,519,565 B1 | 2/2003 | Clements et al. | 2002/0077895 A1 | 6/2002 | Howell |
| 6,520,542 B2 | 2/2003 | Thompson et al. | 2002/0077992 A1 | 6/2002 | Tobin |
| 6,529,880 B1 | 3/2003 | McKeen et al. | 2002/0079367 A1 | 6/2002 | Montani |
| 6,535,726 B1 | 3/2003 | Johnson | 2002/0092914 A1 | 7/2002 | Pentz et al. |
| 6,546,373 B1 | 4/2003 | Cerra | 2002/0095298 A1 | 7/2002 | Ewing |
| 6,547,133 B1 | 4/2003 | DeVries, Jr. et al. | 2002/0095343 A1 | 7/2002 | Barton et al. |
| 6,549,912 B1 | 4/2003 | Chen | 2002/0095389 A1 | 7/2002 | Gaines |
| 6,560,581 B1 | 5/2003 | Fox et al. | 2002/0095587 A1 | 7/2002 | Doyle et al. |
| 6,577,229 B1 | 6/2003 | Bonneau et al. | 2002/0097144 A1 | 7/2002 | Collins et al. |
| 6,578,768 B1 | 6/2003 | Binder et al. | 2002/0107007 A1 | 8/2002 | Gerson |
| 6,581,839 B1 | 6/2003 | Lasch et al. | 2002/0107742 A1 | 8/2002 | Magill |
| 6,587,835 B1 | 7/2003 | Treyz et al. | 2002/0109580 A1 | 8/2002 | Shreve et al. |
| 6,588,660 B1 | 7/2003 | Buescher et al. | 2002/0111210 A1 | 8/2002 | Luciano, Jr. et al. |
| 6,589,119 B1 | 7/2003 | Orus et al. | 2002/0111917 A1 | 8/2002 | Hoffman et al. |
| 6,598,024 B1 | 7/2003 | Walker et al. | 2002/0113082 A1 | 8/2002 | Leatherman et al. |
| 6,608,995 B1 | 8/2003 | Kawasaki et al. | 2002/0116274 A1 | 8/2002 | Hind et al. |
| 6,609,655 B1 | 8/2003 | Harrell | 2002/0120584 A1 | 8/2002 | Hogan et al. |
| 6,623,039 B2 | 9/2003 | Thompson et al. | 2002/0126010 A1 | 9/2002 | Trimble et al. |
| 6,626,356 B2 | 9/2003 | Davenport et al. | 2002/0131567 A1 | 9/2002 | Maginas |
| 6,628,961 B1 | 9/2003 | Ho et al. | 2002/0138438 A1 | 9/2002 | Bardwell |
| 6,636,833 B1 | 10/2003 | Flitcroft et al. | 2002/0140542 A1 | 10/2002 | Prokoski et al. |
| 6,650,887 B2 | 11/2003 | McGregor et al. | 2002/0145043 A1 | 10/2002 | Challa et al. |
| 6,662,166 B2 | 12/2003 | Pare et al. | 2002/0147913 A1 | 10/2002 | Yip |
| 6,665,405 B1 | 12/2003 | Lenstra | 2002/0148892 A1 | 10/2002 | Bardwell |
| 6,669,086 B2 | 12/2003 | Abdi et al. | 2002/0152123 A1 | 10/2002 | Giordano et al. |
| 6,671,358 B1 | 12/2003 | Seidman et al. | 2002/0154795 A1 | 10/2002 | Lee et al. |
| 6,674,786 B1 | 1/2004 | Nakamura et al. | 2002/0166891 A1 | 11/2002 | Stoutenburg et al. |
| 6,679,427 B1 | 1/2004 | Kuroiwa | 2002/0174067 A1 | 11/2002 | Hoffman et al. |
| 6,681,328 B1 | 1/2004 | Harris et al. | 2002/0176522 A1 | 11/2002 | Fan |
| 6,684,269 B2 | 1/2004 | Wagner | 2002/0178063 A1 | 11/2002 | Gravelle et al. |
| 6,687,714 B1 | 2/2004 | Kogen et al. | 2002/0178369 A1 | 11/2002 | Black |
| 6,690,930 B1 | 2/2004 | Dupre | 2002/0185543 A1 | 12/2002 | Pentz et al. |
| 6,693,513 B2 | 2/2004 | Tuttle | 2002/0188501 A1 | 12/2002 | Lefkowith |
| 6,705,530 B2 | 3/2004 | Kiekhaefer | 2002/0190125 A1 | 12/2002 | Stockhammer |
| 6,711,262 B1 | 3/2004 | Watanen | 2002/0194303 A1 | 12/2002 | Suila et al. |
| 6,732,936 B1 | 5/2004 | Kiekhaefer | 2002/0194503 A1 | 12/2002 | Faith et al. |
| 6,742,120 B1 | 5/2004 | Markakis et al. | 2002/0196963 A1 | 12/2002 | Bardwell |
| 6,747,546 B1 * | 6/2004 | Hikita et al. ............. 340/10.31 | 2003/0009382 A1 | 1/2003 | DArbelott et al. |
| 6,760,581 B2 | 7/2004 | Dutta | 2003/0014307 A1 | 1/2003 | Heng |
| 6,769,718 B1 | 8/2004 | Warther et al. | 2003/0014357 A1 | 1/2003 | Chrisekos et al. |
| 6,771,981 B1 | 8/2004 | Zalewski et al. | 2003/0014891 A1 | 1/2003 | Nelms et al. |
| 6,789,012 B1 | 9/2004 | Childs et al. | 2003/0018532 A1 | 1/2003 | Dudek et al. |
| 6,834,270 B1 | 12/2004 | Pagani et al. | 2003/0018567 A1 | 1/2003 | Flitcroft et al. |
| 6,851,617 B2 | 2/2005 | Saint et al. | 2003/0025600 A1 | 2/2003 | Blachard |
| 6,853,087 B2 | 2/2005 | Neuhaus et al. | 2003/0028481 A1 | 2/2003 | Flitcroft et al. |
| 6,853,894 B1 | 2/2005 | Kolls | 2003/0046228 A1 | 3/2003 | Berney |
| 6,853,987 B1 | 2/2005 | Cook | 2003/0054836 A1 | 3/2003 | Michot |
| 6,857,566 B2 | 2/2005 | Wankmueller | 2003/0055727 A1 | 3/2003 | Walker et al. |
| 6,859,672 B2 | 2/2005 | Roberts et al. | 2003/0057226 A1 | 3/2003 | Long |
| 6,895,310 B1 | 5/2005 | Kolls | 2003/0057278 A1 | 3/2003 | Wong |
| 6,994,262 B1 | 2/2006 | Warther | 2003/0069828 A1 | 4/2003 | Blazey et al. |
| 7,003,501 B2 | 2/2006 | Ostroff | 2003/0069846 A1 | 4/2003 | Marcon |
| 7,069,444 B2 | 6/2006 | Lowensohn et al. | 2003/0112972 A1 | 6/2003 | Hattick et al. |
| 7,096,204 B1 | 8/2006 | Chen et al. | 2003/0120554 A1 | 6/2003 | Hogan et al. |
| 7,100,821 B2 | 9/2006 | Rasti | 2003/0121969 A1 | 7/2003 | Wankmueller |
| 7,103,575 B1 | 9/2006 | Linehan | 2003/0130820 A1 | 7/2003 | Lane, III |
| 7,136,835 B1 | 11/2006 | Flitcroft et al. | 2003/0132284 A1 | 7/2003 | Reynolds et al. |
| 7,213,748 B2 | 5/2007 | Tsuei et al. | 2003/0140228 A1 | 7/2003 | Binder |
| 2001/0013542 A1 | 8/2001 | Horowitz et al. | 2003/0163699 A1 | 8/2003 | Pailles et al. |
| 2001/0024157 A1 | 9/2001 | Hansmann et al. | 2003/0167207 A1 | 9/2003 | Berardi et al. |

| | | | |
|---|---|---|---|
| 2003/0177347 A1 | 9/2003 | Schneier et al. | |
| 2003/0183689 A1 | 10/2003 | Swift et al. | |
| 2003/0183699 A1 | 10/2003 | Masui | |
| 2003/0187786 A1 | 10/2003 | Swift et al. | |
| 2003/0187787 A1 | 10/2003 | Freund | |
| 2003/0187790 A1 | 10/2003 | Swift et al. | |
| 2003/0187796 A1 | 10/2003 | Swift et al. | |
| 2003/0195037 A1 | 10/2003 | Vuong et al. | |
| 2003/0195842 A1 | 10/2003 | Reece | |
| 2003/0195843 A1 | 10/2003 | Matsuda et al. | |
| 2003/0200184 A1 | 10/2003 | Dominguez et al. | |
| 2003/0218066 A1 | 11/2003 | Fernandes et al. | |
| 2003/0220876 A1 | 11/2003 | Burger et al. | |
| 2003/0222153 A1 | 12/2003 | Pentz et al. | |
| 2003/0225623 A1 | 12/2003 | Wankmueller | |
| 2003/0225716 A1 | 12/2003 | Atkinson et al. | |
| 2003/0227550 A1 | 12/2003 | Manico et al. | |
| 2003/0233334 A1 | 12/2003 | Smith | |
| 2004/0006539 A1 | 1/2004 | Royer et al. | |
| 2004/0010462 A1 | 1/2004 | Moon et al. | |
| 2004/0015451 A1 | 1/2004 | Sahota et al. | |
| 2004/0016796 A1 | 1/2004 | Hann et al. | |
| 2004/0020982 A1 | 2/2004 | Hoffman et al. | |
| 2004/0029569 A1 | 2/2004 | Khan et al. | |
| 2004/0030601 A1 | 2/2004 | Pond et al. | |
| 2004/0039814 A1 | 2/2004 | Crabtree et al. | |
| 2004/0039860 A1 | 2/2004 | Mills et al. | |
| 2004/0044627 A1 | 3/2004 | Russell et al. | |
| 2004/0083184 A1 | 4/2004 | Tsuei et al. | |
| 2004/0139021 A1 | 7/2004 | Reed et al. | |
| 2005/0017068 A1 | 1/2005 | Zalewski et al. | |
| 2005/0038718 A1 | 2/2005 | Barnes et al. | |
| 2005/0040272 A1 | 2/2005 | Argumedo et al. | |
| 2005/0119978 A1 | 6/2005 | Ates | |
| 2005/0121512 A1 | 6/2005 | Wankmueller | |

FOREIGN PATENT DOCUMENTS

| | | |
|---|---|---|
| EP | 0 358 525 A2 | 3/1990 |
| EP | 0358525 | 3/1990 |
| EP | 0 424 726 A1 | 10/1990 |
| EP | 0 484 726 A1 | 5/1992 |
| EP | 0 933 717 A2 | 8/1999 |
| EP | 0 956 818 A1 | 11/1999 |
| EP | 0 959 440 A2 | 11/1999 |
| EP | 0 984 404 A2 | 3/2000 |
| EP | 1 016 947 A2 | 7/2000 |
| EP | 1016947 | 7/2000 |
| EP | 1 039 403 A2 | 9/2000 |
| EP | 1 104 909 A2 | 6/2001 |
| EP | 1 113 387 A2 | 7/2001 |
| EP | 1 115 095 A2 | 7/2001 |
| EP | 1 199 684 A2 | 4/2002 |
| EP | 1 251 450 A1 | 10/2002 |
| GB | 2 347 537 A | 9/2000 |
| GB | 2347537 | 9/2000 |
| GB | 2 361 790 A | 10/2001 |
| JP | 2000-11109 A | 1/2000 |
| JP | 2000-011109 A | 1/2000 |
| JP | 2000015288 A | 1/2000 |
| JP | 2000-40181 A | 2/2000 |
| JP | 2000-040181 A | 2/2000 |
| JP | 2000067312 A | 3/2000 |
| JP | 2000207641 A | 7/2000 |
| JP | 2001-005931 A | 1/2001 |
| JP | 2001-5931 A | 1/2001 |
| JP | 2001283122 A | 10/2001 |
| WO | 95/32919 | 12/1995 |
| WO | WO 95/32919 | 12/1995 |
| WO | 97/009688 A3 | 3/1997 |
| WO | 99/03057 A1 | 1/1999 |
| WO | WO 99/03057 A1 | 1/1999 |
| WO | 99/049424 A1 | 9/1999 |
| WO | 00/10144 A1 | 2/2000 |
| WO | WO 00/10144 A1 | 2/2000 |
| WO | 00/38088 A1 | 6/2000 |
| WO | WO 00/38088 A1 | 6/2000 |
| WO | 00/049586 A1 | 8/2000 |
| WO | 01/04825 A1 | 1/2001 |
| WO | WO 01/04825 A1 | 1/2001 |
| WO | 01/15098 A1 | 3/2001 |
| WO | WO 01/15098 A1 | 3/2001 |
| WO | 01/43095 A2 | 6/2001 |
| WO | WO 01/43095 A2 | 6/2001 |
| WO | 01/72224 A1 | 10/2001 |
| WO | 01/77856 A1 | 10/2001 |
| WO | 01/80473 A2 | 10/2001 |
| WO | WO 01/72224 A1 | 10/2001 |
| WO | WO 01/77856 A1 | 10/2001 |
| WO | WO 01/80473 A2 | 10/2001 |
| WO | 01/86535 A1 | 11/2001 |
| WO | 01/90962 A1 | 11/2001 |
| WO | WO 01/86535 A1 | 11/2001 |
| WO | WO 01/90962 A1 | 11/2001 |
| WO | 01/95243 A2 | 12/2001 |
| WO | WO 01/95243 A2 | 12/2001 |
| WO | 02/01485 A1 | 1/2002 |
| WO | WO 02/01485 A1 | 1/2002 |
| WO | 02/13134 A2 | 2/2002 |
| WO | WO 02/13134 A2 | 2/2002 |
| WO | WO 02/21903 | 3/2002 |
| WO | 02/063545 A2 | 8/2002 |
| WO | 02/065246 A2 | 8/2002 |
| WO | 02/065404 A2 | 8/2002 |
| WO | WO 02/063545 A2 | 8/2002 |
| WO | WO 02/065246 A2 | 8/2002 |
| WO | WO 02/065404 A2 | 8/2002 |
| WO | 02/069221 A1 | 9/2002 |
| WO | 02/073512 A1 | 9/2002 |
| WO | WO 02/069221 A1 | 9/2002 |
| WO | WO 02/073512 A1 | 9/2002 |
| WO | 02/086665 A2 | 10/2002 |
| WO | WO 02/086665 A2 | 10/2002 |
| WO | 02/091281 A2 | 11/2002 |
| WO | WO 02/091281 A2 | 11/2002 |
| WO | 02/097575 A2 | 12/2002 |
| WO | 02/101670 A2 | 12/2002 |
| WO | WO02/097575 | 12/2002 |
| WO | WO 02/101670 A2 | 12/2002 |
| WO | 03/007623 A3 | 3/2003 |

OTHER PUBLICATIONS

"Physical Reality: A Second Look", Ken Sharp, Senior Technical Editor, http://www.idsystems.com/reader/1999_03/phys0399_pt2/phys0399_pt2.htm (6 pages).

"'Magic Wands' to Speed Mobile Sales", BobBrewin, Jan. 15, 2001, http://www.computerworld.com/mobiletopics/mobile/story/1,10801,563300.html (4 pages).

"Mobile Speedpass Goes Global as Mobil Singapore Rolls Out Asia's First RFID-Based Pay-At-The-Pump System", Press Release, Apr. 5, 1999, http://www.ti.com/tiris/docs/news_releases/rel12.htm (3 pages).

"Speedpass Unleashed", June 4, 2002 http://www.cardweb.com/cardtrak/news/cf2_20a_97.html (2 pages).

Prophecy Central Update #9, Oct. 10, 1997, http://www.bible-prophecy.com/pcu9.htm (5 pages).

International Newsletter of the TI RFID Group, Issue 20, 2000 (12 pages).

"CES: Microsoft's Spot Technology has Humble Origins", by James Niccolai, Jan. 10, 2003, http://archive.infoworld.com/articles/hn/xml/03/01/10/030110hnspot.xml?s=IDGNS (3 pages).

"Microsft: See Spot Run On Your Wrist", by Richard Shim, Jun. 5, 2003, http://news.com.com/2100-1041_3-1013442.html?tag=fd_top (1 page).

"Networking: Microsoft Spot", by Jeremy A. Kaplan, Jul. 1, 2003, http://www.pcmag.com/print_article/0,3048,a=43561,00.asp (2 pages).

"Microsoft Launches Smart Personal Object Technology Initiative", Press Release from COMDEX Fall 2002, Nov. 17, 2002, http://www.Microsoft.com/presspass/features/2002/nov02/11-17SPOT.asp (4 pages).

"Bank Extends RFID Payment Pilot: Bank of America will continue to test its QuickWave RFID payment card for another three months", RFID Journnal, Jan. 23, 2003.

"MasterCard to Test RFID Card: Pilot will test whether consumers, merchants and credit card issuers value "contactless" payments", RFID Journal, Dec. 20, 2002.

"Vendors Target Amusement Parks: Protecting children and enabling cashless payments make RFID an appealing option for the entertainment industry", RFID Journal, Nov. 27, 2002.

"Inside's Next-Gen Smart Card: The French company plans to introduce an RFID card the uses a 16-bit microprocessor and new encryption technology", RFID Journal, Oct. 29, 2002.

"Sony, Philips Creating RFID Link: Consumer electronics giants are jointly developing a new RFID standard for payments and for communication between devices", RFID Journal, Sep. 17, 2002.

"Japan Gets Digital Ticket System: A national ticket seller and phone company are teaming up to create an electronic-ticket network", RFID Journal, Aug. 21, 2002.

"Security for Wireless Java: NTRU, a startup that offers security software, has released a Java version of its NTRU encryption algorithm", RFID Journal, Jun. 27, 2002.

"Making RFID Payments Ubiquitous: Philips and Visa want people to able to pay for goods and services anywhere by using RFID chips embedded in phones and other devices", RFID Journal, Jun. 2, 2003.

"RFID Smart Cards Gain Ground: The convenience of contactless transactions is driving widespread adoption of contactless smart cards", RFID Journal, Apr. 9, 2003.

"TI Embraces Prox Card Standard: Texas Instrument's ISO 14443 payment platform promises faster data transfer rates and more security", RFID Journal, Mar. 6, 2003.

"Multiple Frequency Transponders: Volume production of dual-band RFID chips begins", Frontline Solutions, Jul. 16, 2003.

Functional Specification, Standard Card IC MF1 1C S50, Philips Semiconductors, Product Specification Rev. 5.1 May 2001.

International Search Report and Written Opinion of the International Searching Authority, PCT/US05/26067, May 23, 2007.

"Physical Reality: A Second Look", Ken Sharp, Senior Technical Editor, http://www.idsystems.com/reader/1999_03/phys0399_pt2/phys0399_pt2.htm.

"'Magic Wands' to Speed Mobile Sales", Bob Brewin, Jan. 15, 2001, http://www.computerworld.com/mobiletopics/mobile/story/1,10801,563300.html.

Functional Specification, Standard Card IC MF1 1C S. 50, Philips Semiconductors, Product Specification Rev. 5.1 May 2001.

"Credit Card Offer Travelers New Benefit", PR Newswire, Aug. 5, 1987.

"Fingerprint Analysis- The Basics", http://www.crimtrac.gov.au/fingerprintanalysis.htm, Feb. 18, 2004, 3 pages.

"Fingerprint Technology- Identix Inc.- Empowering Identification™- Understanding Biometrics", http://www.identix.com/newsroom/news_biometrics_finger.html, Feb. 18, 2004, 1 page.

"Identix Inc.—Empowering Identification™—Understanding Biometrics", http://www.identix.com/newsroom/news—biometrics—face.html, 1 page.

"Individual Biometric- Facial Recognition", http://ctl.ncsc.dni.us/biomet%20web/Bmfacial.html, Feb. 18, 2004, 2 pages.

"Individual Biometric- Fingerprint", http://ctl.ncsc.dni.us/biomet%20web/BMFingerprint.html, Feb. 18, 2004, 3 pages.

"Individual Biometric- Hand Geometry", http://ctl.ncsc.dni.us/biomet%20web/BMHand.html, Feb. 18, 2004, 2 pages.

"Individual Biometric- Iris Scan", http://ctl.ncsc.dni.us/biomet%20web/BMIris.html, Feb. 18, 2004, 2 pages.

"Individual Biometric- Retinal Scan", http://ctl.ncsc.dni.us/biomet%20web/BMRetinal.html, Feb. 18, 2004, 2 pages.

"Individual Biometric- Vascular Patterns", http://ctl.ncsc.dni.us/biomet%20web/BMVascular.html, Feb. 18, 2004, 1 page.

"International Biometric Group- Signature Biometrics: How it Works", http://www.ibgweb.com/reports/public/reports/signature-scan_tech.html, Feb. 18, 2004, 1 page.

"International Biometric Group- Voice Recognition Technology: How it Works", http://www.ibgweb.com/reports/public/reports/voice-scan_tech.html, Feb. 18, 2004, 1 page.

"ISO Magnetic Strip Card Standards", http://www.cyberd.co.uk/support/technotes/isocards.htm, Feb. 9, 2004, 4 pages.

"New Evidence about Positive Three-Tier Co-pay Performance Presented at Express Scripts 2000 Outcomes Conference", PR Newswire Association, Inc., Jun. 28, 2000.

"Pay by Touch- Press Releases", http://www.paybytouch.com/press/html, Feb. 10, 2004, 3 pages.

"Paying It By Ear", The Guardian http://money.guardian.co.uk/creditanddebt/creditcards/story/0,1456,876908,00.html, Jan. 18, 2003, 3 pages.

"PowerPay RFID Payment and Marketing Solution Speeds Purchases at Seahawks Stadium with Technology from Texas Instruments", http://www.powerpayit.com/news/Seahawks_pr.html, Feb. 9, 2004, 20 pages.

"Prestige Credit Cards: Those Pricey Plastics", Changing Times, Apr. 1986.

"Shell Introduces Optional Credit Card", The Associated Press, Sep. 3, 1985.

"Shell Introducing Expanded 'Signature' Credit Card", Tulsa Business Chronicle, Sep. 5, 1985.

"Shell-Oil: Introduces Shell Signature Travel and Entertainment Credit Card", Business Wire, Sep. 3, 1985.

"Smart Card Developer's Kit: Some Basic Standards for Smart Card", http://unix.be.eu.org/docs/smart-card-developer-kit/ch03/033-035.html, Feb. 9, 2004, 2 pages.

"The Chase Manhattan Bank Today Announced a Comprehensive Program to Enhance the Value of All its Credit Cards", PR Newswire, Dec. 18, 1986.

"The Henry Classification System", International Biometric Group, 7 pages.

American Express to offer disposable credit card numbers, CNN.com. U.S. News, www.cnn.com/2000/US/09/08/online.payments.ap/, Sep. 8, 2000.

American Express, Private Payments SM: A New Level of Security from American Express, American Express Website, Cards.

Bonsor, "How Facial Recognition Systems Works", http://computer.howstuffworks.com/facial-recognition.htm/printable, Feb. 18, 2004, 6 pages.

Bowman, "Everything You Need to Know About Biometrics", Identix Corporation, Jan. 2008, 8 pages.

Carey, Gordon, "Multi-tier Copay", Pharmaceutical Executive, Feb. 2000.

Crumbaugh, Darlene M., "Effective Marketing Positions: Check card as consumer lifeline", Hoosier Banker, Apr. 1998, p. 10, vol. 82, Issue 4.

Disposable Credit Card Numbers, courtesy of CardRatings.org, The Dollar Stretcher, www.stretcher.com/stories/01/010212e.cfm, Jan. 2001.

Docmemory, RFID Takes Priority With Wal-Mart, http://www.simmtester.com/page/news/shownews.asp?num=6650, Feb. 9, 2004, 2 pages.

Evers, "Judge Dismisses FTC Suite Against Rambus", IDG New Service, http://www.infoworld.com/article/04/02/18/HNjudgedismisses_1.html, Feb. 18, 2004, 3 pages.

Gabber, et al., "Agora: A Minimal Distributed Protocol for Electronic Commerce", USENIX Oakland, CA, Nov. 18, 1996.

Goldwasser, Joan, "Best of the Cash-back Cards", Kiplinger's Personal Finance Magazine, Apr. 1999.

Greene, Thomas C., American Express offers temporary CC numbers for the Web, The Register, www.theregister.com.uk/content/1/13132.html, Sep. 9, 2000.

Harris, "How Fingerprint Scanners Work", http://computer.howstuffworks.com/fingerprint-scanner.htm/printable, Feb. 18, 2004, 6 pages.

http://www.palowireless.com/infotooth/tutorial.asp, Apr. 28, 2003.

http://www.palowireless.com/infotooth/tutorial/l2cap.asp, Apr. 28, 2003.

http://www.palowireless.com/infotooth/tutorial/baseband.asp, Apr. 28, 2003.

http://www.palowireless.com/infotooth/tutorial/hci.asp, Apr. 28, 2003.

http://www.palowireless.com/infotooth/tutorial/lmp.asp, Apr. 28, 2003.

http://www.palowireless.com/infotooth/tutorial/k1_gap.asp, Apr. 28, 2003.

http://www.palowireless.com/infotooth/tutorial/profiles.asp, Apr. 28, 2003.

http://www.palowireless.com/infotooth/tutorial/radio.asp, Apr. 28, 2003.

http://www.palowireless.com/infotooth/tutorial/rfcomm.asp, Apr. 28, 2003.

http://www.palowireless.com/infotooth/tutorial/sdp.asp, Apr. 28, 2003.

http://www.palowireless.com/infotooth/whatis.asp, Apr. 28, 2003.

http://www.semiconductors.philips.com/news/content/file_878.html, Apr. 7, 2003.

Hurley et al., "Automatic Ear Recognition by Force Field Transformations", The Institution of Electrical Engineers, 2000, pp. 7/1-7/5.

International Search Report and Written Opinion of the International Searching Authority, PCT/US05/26101, May 13, 2008.

Korotkaya, "Biometric Person Authentication: Odor", Department of Information Technology, Laboratory of Applied Mathematics, Lappeenranta University of Technology, 18 pages.

Krakow, "Credit on Your Key Ring, Buy Gas at Mobil, Exxon and Soon Burgers at McDonald's", MSNBC, http://www.msnbc.msn.com/id/3072638, Feb. 17, 2004, 4 pages.

Kulkarni, et al., "Biometrics: Speaker Verification"http://biometrics.cse.msu.edu/speaker.html, Mar. 8, 2004, 5 pages.

Kuntz, Mary, "Credit Cards as Good as Gold", Forbes, Nov. 4, 1985.

Lahey, Liam, "Microsoft Bolsters Rebate Structure", Computer Dealer News, Feb. 8, 2002.

Lamond, "Credit Card Transactions Real World and Online"© 1996.

Luettin, "Visual Speech and Speaker Recognition", http://herens.idiap.ch/~luettin/luettin-thesis.bib.abs.html, Jun. 30, 2000, 1 page.

Martin, Zack, One-Time Numbers Stop Web Hackers From Pilfering Data, Card Marketing, Thomson Financial, www.cardforum.com/html/cardmark/jan01_c3.htm, Jan. 2001.

McPerson, "The Evolution of Mobile Payment", Financial Insights, http://www.banktech.com/story/news/showArticle.jhtml?articleID=17601432, Feb. 2, 2004, 2 pages.

Nyman, Judy, "Free Income Tax Clinics are Opening as Apr. 30 Deadline Draws Nearer", The Toronto Star, Final Edition, Mar. 25, 1986.

Obel, Michael, "Oil Companies Push Marketing, Cost Cutting to Fortify Earnings", Oil & Gas Journal, Sep. 16, 1985.

Pay By Touch—Company, http://www.paybytouch.com/company.html.

Roberti, "TI Embraces Prox Card Standard", http://www.ti.com/tiris/docs/news/in_the_news/2003/3-6-03.shtml, Mar. 6, 2003, 2 pages.

Rohde, "Microsoft, IBM and Phillips Test RFID Technology", IDG New Service, http://www.computerweekly.com/Article127889.htm, Feb. 9, 2004, 3 pages.

Ross et al., "Biometrics: Hand Geomerty", http://biometrics.cse.msu.msu.edu/hand_geometry.html, Feb. 26, 2004, 2 pages.

Schmuckler, Eric, "Playing Your Cards Right", Forbes, Dec. 28, 1987.

Sony, Philips to Test RFID Platform, RFID Journal, May 8, 2003, 2 pages.

Wilson, "Putting Their Finger on It", http://sanfrancisco.bizjournals.com/sanfrancisco/stories/2003/10/20/story6.html?t=printable, Feb. 9, 2004, 2 pages.

"Core One Credit Union- Discover the Advantage", http://coreone.org/2visa.html, Copyright 2001, (Last Visited Oct. 9, 2002).

* cited by examiner

| CALLING CARD NUMBER | CARD TYPE | CARD INFORMATION |
|---|---|---|
| 1 | A | REMAINING BALANCE = $0.00<br>BALANCE DEPLETION PROTOCOL = BILL TO "708-555-1234" |
| 2 | B | REMAINING BALANCE = $5.00<br>BALANCE DEPLETION PROTOCOL = DISCONNECT |
| 3 | C | BILL ALL CALLS TO DIRECTORY NUMBER 708-555-6457 |

FIG. 14

SYSTEMS AND METHODS FOR PROVIDING A RF TRANSACTION DEVICE OPERABLE TO STORE MULTIPLE DISTINCT CALLING CARD ACCOUNTS

CROSS-REFERENCE TO RELATED APPLICATIONS

This application is a continuation-in-part (CIP) of the following U.S. patent applications: U.S. patent application Ser. No. 10/192,488, entitled "SYSTEM AND METHOD FOR RFID PAYMENT USING RADIO FREQUENCY IDENTIFICATION IN CONTACT AND CONTACTLESS TRANSACTIONS," filed on Jul. 9, 2002 (which itself claims priority to U.S. Provisional Patent Application No. 60/304,216, filed Jul. 10, 2001), U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003 (which itself claims priority to, inter alia, U.S. Provisional Patent Application No. 60/396,577, filed Jul. 16, 2002), U.S. patent application Ser. No. 10/608,792, entitled "METHOD AND APPARATUS FOR ENROLLING WITH MULTIPLE TRANSACTION ENVIRONMENTS," filed Jun. 27, 2003, and U.S. patent application Ser. No. 10/435,420, entitled "SYSTEMS AND METHODS FOR MANAGING ACCOUNT INFORMATION LIFE CYCLES," filed May 9, 2003, all of which are hereby incorporated by reference.

FIELD OF INVENTION

The present invention generally relates to payment systems, and more particularly, to systems and methods for a transaction device including multiple data sets associated with various distinct transaction accounts.

BACKGROUND OF THE INVENTION

Some financial transaction devices, such as credit cards and loyalty program cards, are capable of accessing information related to multiple accounts. For example, a credit card may be able to access membership data associated with both a credit card account and a wholesale purchase club account. These financial transaction devices may generally include one or more applications for selecting and then securely utilizing a sub-set of specified account information. However, the systems associated with these cards typically delegate the loading of these applications and management of the related data sets to third parties on behalf of both the issuer of the device and "application tenants" residing on the issuer's financial transaction devices. Managing data associated with a credit card via the issuer/third party may involve time consuming steps such as requesting permission to manage data, conforming to data standard formats, and implementing changes. Thus, traditional solutions for managing multiple application tenants are disadvantageous in that the traditional solutions leave a disproportional burden on the issuer and/or the delegated third party in terms of managing accounts on a financial transaction device.

Another disadvantage is that, in general, the financial transaction devices, which are capable of accessing information related to multiple accounts, are typically designed to access only those multiple accounts managed by the same issuer. For example, the same issuer provides both the credit card and the wholesale purchase club account to the user. As such, the issuer providing both accounts generally establishes its own application tenant storage format and management protocol related to the accounts. The established format and protocol is ordinarily different from any format or protocol used by other unrelated issuers, which provides the issuer increased control over access to the account data. Because of the differing unique protocols/formats amongst issuers, multiple issuers typically provide a transaction device corresponding to an account offered by the issuer, where the data for accessing the account is stored in that issuer's protocol/format. Thus, a user wishing to access multiple accounts managed by different issuers, must ordinarily carry at least one transaction device per issuer. Carrying multiple transaction devices can be inconvenient in that the devices may be more easily misplaced, lost or stolen preventing the user from accessing the account.

Another disadvantage of the above conventional methods of managing multiple accounts, which is related to the different issuer formats/protocols, is that, since conventional financial transaction devices typically only store application tenant information related to one issuer, the information may not be recognized by the transaction processing system managed by a second issuer distinct from the first. That is, the user of the financial transaction device typically is only able to use the financial transaction device at locations identified by the issuer or acquirer of the transaction card. The financial transaction device may not be used at any other locations, since the locations not identified by the issuer will not recognize the application tenant information which is typically stored on the device in an issuer determined format. As such, in order to access multiple accounts managed by different issuers using different formats/protocols, the user must typically carry multiple cards, as noted above.

In addition to the above, the conventional multiple account management systems have another disadvantage in that data contained on the financial transaction devices may not be easily updated. That is, traditional financial transaction devices are only "readable" devices, and not "writeable" devices, where the data on the device may be read from the device but not written to the device. More particularly, once the financial device is issued to the user, the data often may not be modified. Instead, where information contained on the device is to be modified, a new physical consumer device (e.g., transaction device) often needs to be issued. That is, the information stored on the financial transaction devices is typically not permitted to be changed without issuer involvement. The issuer may be involved, for example, by verifying compatibility of proposed new or updated information, checking conformance of the data to the issuer's standard formatting and size guidelines, and implementing the changes. Thus, additional burdens are often placed on the issuer where it is desired to add unique data sets to a financial transaction device, or to update the data stored thereon.

As such, storing sufficient data on a single financial transaction device, which permits a user of the single device to complete transactions using multiple transaction accounts issued by different distinct issuers, does not exist. A need exists for a single financial transaction device, which stores multiple independent data sets provided by multiple distinct issuers irrespective of the format/protocol of the various issuers.

SUMMARY OF THE INVENTION

In one exemplary embodiment of the present invention, a system and method is provided for a Radio Frequency operable transaction device for storing multiple distinct data sets of different formats on the RF transaction device. The method includes the steps of: enrolling a first and second data set owner in a multiple account system on a single transaction device program; receiving at a read/write device a data set corresponding to a single device user from at least one of the first and second data set owners; receiving, from the read/write device, at least a first distinct data of a first format at the RF transaction device, wherein the first data set is owned by a first owner; receiving, from the read/write device, at least a second distinct data set of a second format at the RF transaction device, wherein the second data set is owned by a second owner, and wherein the first format is different from the second format; storing the first data set and the second data set on the RF transaction device in distinct fashion and in accordance with the first and second format respectively, where the first data set and the second data set are unique one from the other.

In another example, a RF transaction device comprises a data set management system for facilitating the storage of more than one data set stored on the transaction device, the RF transaction device comprising at least one data storage area configured to store a first distinct data set of a first format and a second distinct data set of a second format different from the first format. The first data set is associated with a first data set owner (e.g., first issuer) and the first data set is configured to be stored on the RF transaction device independent of a second data set (e.g., second issuer); and, the second data set is associated with the second owner and the second data set is configured to be stored on the RF transaction device independent of the first data set, wherein the first data set and the second data set are stored in accordance with the first and second format, respectively.

In yet another exemplary embodiment of the present invention, a data management system comprises: a RF transaction device associated with a first data set of a first format and a second data set of a second format, wherein the RF transaction device is configured to facilitate loading of the first data set without involvement of the second data set owner. The data management system may further comprise a read/write device configured to communicate with the RF transaction device for providing the first and second data sets to the transaction device. The read/write device may be stand-alone, or the device may be connected to a transaction processing network. The read/write device may be used to load the issuer-owned data onto the transaction device in accordance with a data set owner-defined protocol.

In still another exemplary embodiment, the invention secures authorization from a data set owner prior to loading the data on the RF transaction device database. Once authorization is given, the issuer may be "enrolled" in a transaction device multiple account management system, the associated data owned by the enrolled issuer may then be loaded on the transaction device. The data may be loaded in a format recognizable by a merchant system or by a system maintained by the data set owner. Thus, when the transaction device is presented to complete a transaction, the data may be transferred to the issuer in an issuer-recognized format, reducing the need to carry multiple transaction devices for each issuer. That is, the issuer receives the data in a data set owner recognized format and may process the accompanying transaction under data set owner previously established business as usual protocols. In this way, the data set owner is permitted to manage its issuer provided program at the owner location, irrespective of the management of other programs provided by other distinct issuers enrolled in the multiple account management system

BRIEF DESCRIPTION OF THE DRAWINGS

A more complete understanding of the present invention may be derived by referring to the detailed description and claims when considered in connection with the Figures, wherein like reference numbers refer to similar elements throughout the Figures, and:

FIG. 14 is an exemplary representation of calling card data stored in a calling card validation database in accordance with exemplary embodiments of the present invention.

DETAILED DESCRIPTION OF EXEMPLARY EMBODIMENTS

Figure 1:
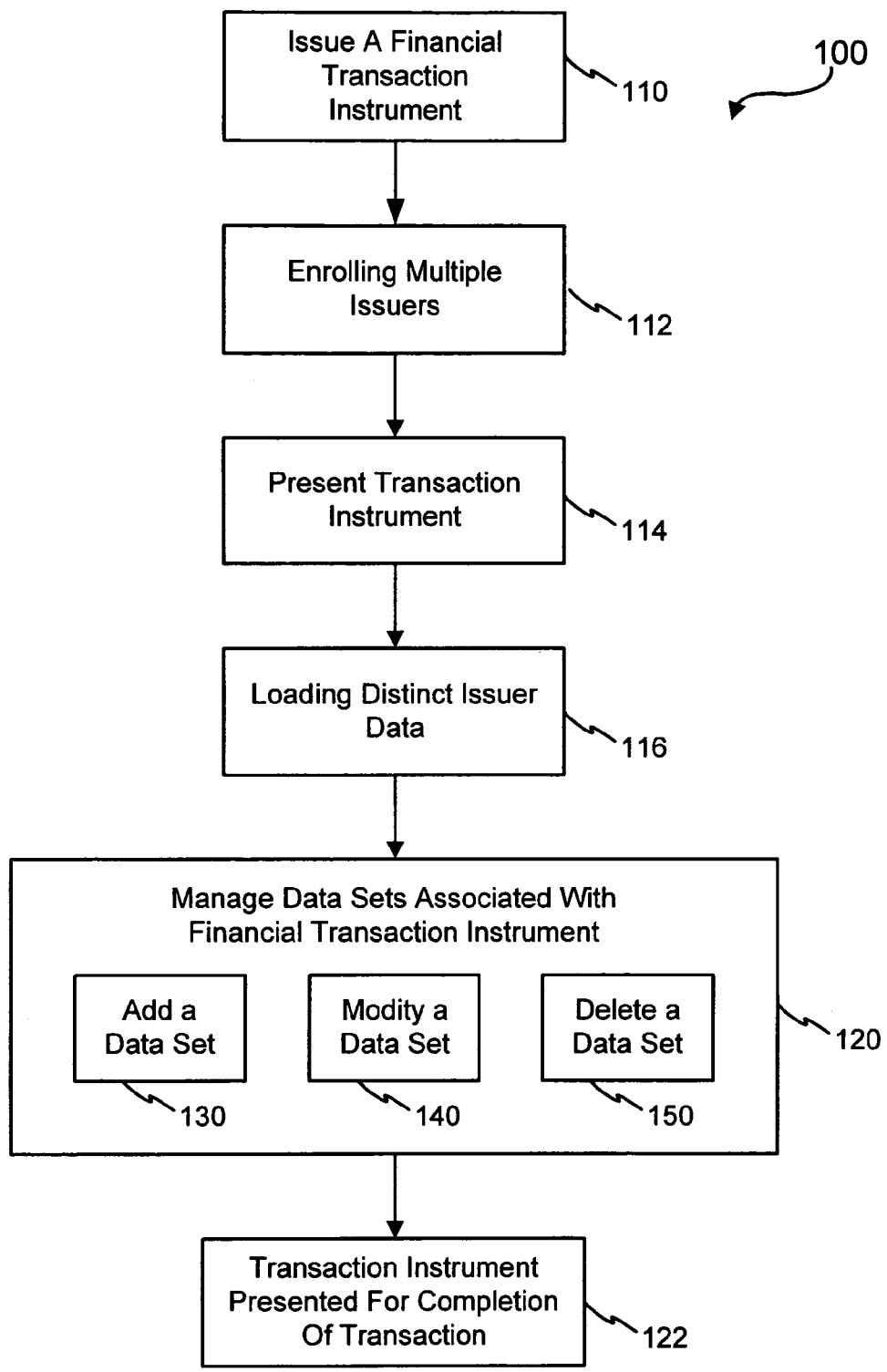
FIG. 1 illustrates a general overview of an exemplary method for loading distinct data sets on a RF transaction device in accordance with an exemplary embodiment of the present invention.

While the exemplary embodiments herein are described in sufficient detail to enable those skilled in the art to practice the invention, it should be understood that other embodiments may be realized and that logical and mechanical changes may be made without departing from the spirit and scope of the invention. Thus, the following detailed description is presented for purposes of illustration only and not of limitation.

The present invention provides a system and method for a RF transaction device configured to receive multiple data sets (e.g., "application tenants") of differing formats, wherein the data sets are associated with a plurality of distinct transaction account issuers. In this context, an "application tenant" may include all or any portion of any data sets, which are substantially correlated to an account issuer, which the issuer may additionally use to substantially identify an instrument user or related account. For example, where the account issuer provides application tenant information, the application tenant may include, inter alia, a membership identifier associated with a user enrolled in an issuer provided transaction account program, and all related subsets of data stored on the transaction instrument. Where multiple application tenants are referred to herein, each tenant may constitute its own distinct data set, independent of any other application tenant data sets. For example, each application tenant may include a unique membership identifier and all associated subsets of data. Alternatively, an application tenant may include a membership identifier and an application for processing all data owned by an issuer. Thus, the data set or subset may include the processing application. Moreover, differing formats, as discussed herein, include differences in all or any portion of the formats. As such, "application tenant" and "distinct data set," and data set "owner" and account "issuer" may be used interchangeably herein.

In addition, it should be noted that although the present invention is described with respect to a financial transaction instrument, the invention is not so limited. The invention is suitable for any instrument capable of storing distinct data sets, which may be provided by multiple distinct account issuers where the distinct data sets may be formatted one different from another. The account may be, for example, a loyalty, debit, credit, incentive, direct debit, savings, financial, membership account or the like. While the information provided by the account issuers may be described as being "owned" by the issuers, the issuers or their designees may simply be a manager of the account.

The present invention may be described herein in terms of functional block components, optional selections and/or various processing steps. It should be appreciated that such functional blocks may be realized by any number of hardware and/or software components configured to perform the specified functions. For example, the present invention may employ various integrated circuit components (e.g., memory elements, processing elements, logic elements, look-up tables, and/or the like), which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (ML), with the various algorithms being implemented with any combination of data structures, objects, processes, routines or other programming elements. Further, it should be noted that the present invention may employ any number of conventional techniques for data transmission, signaling, data processing, network control, and/or the like.

As used herein, the terms "user," "end user," "consumer," "customer" or "participant" may be used interchangeably with each other, and each shall mean any person, entity, machine, hardware, software and/or business. Furthermore, the terms "business" or "merchant" may be used interchangeably with each other and shall mean any person, entity, machine, hardware, software or business. Further still, the merchant may be any person, entity, software and/or hardware that is a provider, broker and/or any other entity in the distribution chain of goods or services. For example, the merchant may be a ticket/event agency (e.g., Ticketmaster, Telecharge, Clear Channel, brokers, agents).

The systems and/or components of the systems discussed herein may also include one or more host servers or other computing systems including a processor configured to process digital data, a memory coupled to the processor for storing digital data, an input digitizer coupled to the processor for inputting digital data, an application program stored in the memory and accessible by the processor for directing processing of digital data by the processor, a display coupled to the processor and memory for displaying information derived from digital data processed by the processor and a plurality of databases, the databases including client data, merchant data, financial institution data and/or like data that could be used in association with the present invention. The user computer and other systems described herein can be in a home or business environment with access to a network. In an exemplary embodiment, access is through the Internet through a commercially available web-browser software package.

Communication between various elements of the present invention is accomplished through any suitable communication means, such as, for example, a telephone network, intranet, Internet, point of interaction device (point of sale device, personal digital assistant, cellular phone, kiosk, etc.), online communications, off-line communications, wireless communications, and/or the like. One skilled in the art may also appreciate that, for security reasons, any databases, systems, or components of the present invention may consist of any combination of databases or components at a single location or at multiple locations, wherein each database or system includes any of various suitable security features, such as firewalls, access codes, encryption, decryption, compression, decompression, and/or the like.

The systems may be suitably coupled to the network via data links. A variety of conventional communications media and protocols may be used for data links. For example, a connection to an Internet Service Provider (ISP) over the local loop as is typically used in connection with standard modem communication, cable modem, Dish networks, ISDN, Digital Subscriber Line (DSL), or various wireless communication methods. The merchant system might also reside within a local area network (LAN) that interfaces to the network via a leased line (T1, D3, etc.). Such communication methods are well known in the art and are covered in a variety of standard texts. See, e.g., Gilbert Held, "Understanding Data Communications" (1996), hereby incorporated by reference.

The computing units may be connected with each other via a data communication network. The network may be a public network and assumed to be insecure and open to eavesdroppers. In the illustrated implementation, the network may be embodied as the Internet. In this context, the computers may or may not be connected to the Internet at all times. For instance, the customer computer may employ a modem to occasionally connect to the Internet, whereas the bank-computing center might maintain a permanent connection to the Internet. Specific information related to the protocols, standards, and application software utilized in connection with the Internet may not be discussed herein. For further information regarding such details, see, for example, Dilip Naik, "Internet Standards and Protocols" (1998); "Java 2 Complete," various authors (Sybex 1999); Deborah Ray and Eric Ray, "Mastering HTML 4.0" (1997); Loshin, "TCP/IP Clearly Explained" (1997). All of these texts are hereby incorporated by reference.

It may be appreciated that many applications of the present invention could be formulated. One skilled in the art may appreciate that a network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it may be readily understood that the invention could also be implemented using IPX, Appletalk, IP-6, NetBIOS, OSI or any number of existing or future protocols. Moreover, the present invention contemplates the use, sale or distribution of any goods, services or information over any network having similar functionality described herein.

In accordance with various embodiments of the invention, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Interbase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and/or the like.

The financial transaction instrument (e.g., smart card, magnetic stripe card, bar code card, optical card, biometric device, radio frequency card or transponder and/or the like) may communicate to the merchant information from one or more data sets associated with the financial transaction instrument. In one example, membership data and credit card data associated with an account or card may be transmitted using any conventional protocol for transmission and/or retrieval of information from an account or associated transaction card (e.g., credit, debit, loyalty, etc.). In one exemplary embodiment, the transaction instrument may be configured to communicate via RF signals. As such, the data contained on the instrument may be communicated via radio frequency signals.

A financial transaction instrument may include one or more physical devices used in carrying out various financial transactions. For example, a financial transaction instrument may include a rewards card, charge card, credit card, debit card, prepaid card, telephone card, smart card, magnetic stripe card, radio frequency card/transponder and/or the like. In yet another exemplary embodiment of the present invention, a financial transaction instrument may be an electronic coupon, voucher, and/or other such instrument.

The financial transaction instrument in accordance with this invention may be used to pay for acquisitions, obtain access, provide identification, pay an amount, receive payment, redeem reward points and/or the like. In the radio frequency ("RF") embodiments of the transaction instrument, instrument-to-instrument transactions may also be performed. See, for example, Sony's "Near Field Communication" ("NFC") emerging standard, which is touted as operating on 13.56 MHz and allowing the transfer of any kind of data between NFC enabled devices and across a distance of up to twenty centimeters. See also, Bluetooth chaotic network configurations; described in more detail at http://www.palowireless.com/infotootb/whatis.asp, which is incorporated herein by reference. Furthermore, data on a first RF device may be transmitted directly or indirectly to another RF device to create a copy of all or part of the original device.

Furthermore, financial transaction instrument as described herein may be associated with various applications, which allow the financial transaction instruments to participate in various programs, such as, for example, loyalty programs. A loyalty program may include one or more loyalty accounts. Exemplary loyalty programs include frequent flyer miles, on-line points earned from viewing or purchasing products or websites on-line and programs associated with diner's cards, credit cards, debit cards, hotel cards, and/or the like. Generally, the user is both the owner of the transaction card account and the participant in the loyalty program; however, this association is not necessary. For example, a participant in a loyalty program may gift loyalty points to a user who pays for a purchase with his own transaction account, but uses the gifted loyalty points instead of paying the monetary value.

For more information on loyalty systems, transaction systems, and electronic commerce systems, see, for example, U.S. Utility patent application Ser. No. 10/304,251, filed on Nov. 26, 2002, by inventors Antonucci, et al., and entitled "System and Method for Transfer of Loyalty Points"; U.S. Continuation-In-Part patent application Ser. No. 10/378,456, filed on Mar. 3, 2003, by inventors Antonucci, et al., and entitled "System and Method for the Real-Time Transfer of Loyalty Points Between Accounts"; U.S. patent application Ser. No. 09/836,213, filed on Apr. 17, 2001, by inventors Voltmer, et al., and entitled "System And Method For Networked Loyalty Program"; U.S. Continuation-In-Part patent application Ser. No. 10/027,984, filed on Dec. 20, 2001, by inventors Ariff, et al., and entitled "System And Method For Networked Loyalty Program"; U.S. Continuation-In-Part patent application Ser. No. 10/010,947, filed on Nov. 6, 2001, by inventors Haines, et al., and entitled "System And Method For Networked Loyalty Program"; U.S. Continuation-In-Part patent application Ser. No. 10/084,744, filed on Feb. 26, 2002, by inventors Bishop,.et al., and entitled "System And Method For Securing Data Through A PDA Portal"; the Shop AMEX™ system as disclosed in Ser. No. 60/230,190, filed Sep. 5, 2000; the Loyalty As Currency™ and Loyalty Rewards Systems disclosed in Ser. No. 60/197,296, filed on Apr. 14, 2000, Ser. No. 60/200,492, filed Apr. 28, 2000, Ser. No. 60/201,114, filed May 2, 2000; a digital wallet system disclosed in U.S. Ser. No. 09/652,899, filed Aug. 31, 2000; a stored value card as disclosed in Ser. No. 09/241,188, filed on Feb. 1, 1999; a system for facilitating transactions using secondary transaction numbers disclosed in Ser. No. 09/800,461, filed on Mar. 7, 2001, and also in related provisional applications Ser. No. 60/187,620, filed Mar. 7, 2000, Ser. No. 60/200, 625, filed Apr. 28, 2000, and Ser. No. 60/213,323, filed May 22, 2000, all of which are herein incorporated by reference. Other examples of online loyalty systems are disclosed in Netcentives U.S. Pat. No. 5,774,870, issued on Jun. 30, 1998, and U.S. Pat. No. 6,009,412, issued on Dec. 29, 1999, both of which are hereby incorporated by reference.

Further still, a "code," "account", "account number," "identifier," "loyalty number" or "membership identifier," as used herein, includes any device, code, or other identifier/ indicia suitably configured to allow the consumer to interact or communicate with the system, such as, for example, authorization/access code, personal identification number (PIN), Internet code, other identification code, and/or the like that is optionally located on a rewards card, charge card, credit card, debit card, prepaid card, telephone card, smart card, magnetic stripe card, bar code card, radio frequency card and/or the like. The account number may be distributed and stored in any form of plastic, electronic, magnetic, radio frequency, audio and/or optical device capable of transmitting or downloading data from itself to a second device. A customer account number may be, for example, a sixteen-digit credit card number, although each credit provider has its own numbering system, such as the fifteen-digit numbering system used by an exemplary loyalty system. Each company's credit card numbers comply with that company's standardized format such that the company using a sixteen-digit format may generally use four spaced sets of numbers, as represented by the number "0000 0000 0000 0000." The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer. In addition, loyalty account numbers of various types may be used.

Further yet, the "transaction information" in accordance with this invention may include the nature or amount of transaction, as well as, a merchant, user, and/or issuer identifier, security codes, or routing numbers, and the like. In various exemplary embodiments of the present invention, one or more transaction accounts may be used to satisfy or complete a transaction. For example, the transaction may be only partially completed using the transaction account(s) correlating to the application tenant information stored on the transaction instrument with the balance of the transaction being completed using other sources. Cash may be used to complete part of a transaction and the transaction account associated with a user and the transaction instrument, may be used to satisfy the balance of the transaction. Alternatively, the user may identify which transaction account, or combination of transaction accounts, stored on the transaction instrument the user desires to complete the transaction. Any known or new methods and/or systems configured to manipulate the transaction account in accordance with the invention may be used.

In various exemplary embodiments, the financial transaction instrument may be embodied in form factors other than, for example, a card-like structure. As already mentioned, the financial transaction instrument may comprise an RF transponder, a speed pass, store discount card, or other similar device. Furthermore, the financial transaction instrument may be physically configured to have any decorative or fanciful shape including key chains, jewelry and/or the like. The financial transaction instrument may furthermore be associated with coupons. A typical RF device which may be used by the present invention is disclosed in U.S. application Ser. No. 10/192,488, entitled "System And Method For Payment Using Radio Frequency Identification In Contact And Contactless Transactions," and its progeny, which are all commonly assigned, and which are all incorporated herein by reference.

As used herein, the term "data set" may include any set of information and/or the like which may be used, for example, in completing a transaction. For example, data sets may include information related to credit cards, debit cards, membership clubs, loyalty programs, speed pass accounts, rental car memberships, frequent flyer programs, coupons, tickets and/or the like. This information may include membership identifiers, account number(s), personal information, balances, past transaction details, account issuer routing number, cookies, identifiers, security codes, and/or any other information. The data set may additionally include an issuer defined management process for determining which subsets of data are to be provided to an issuer or merchant. In some instances, a data set may be associated with one or more account numbers corresponding to accounts maintained by the account issuer. A data set may contain any type of information stored in digital format. For example, a data set may include account numbers, programs/applications, scripts, cookies, instruments for accessing other data sets, and/or any other information.

Various information and data are described herein as being "stored." In this context, "stored" may mean that the information is kept on a database. In accordance with the invention, a database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. A database may be organized in any suitable manner, including as data tables or lookup tables. Association of certain data may be accomplished through any data association technique known and/or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables may be the same. However, data tables having similar, though not identical, data in the key fields may also be merged by using AGREP, for example.

Although the same owner may own all data sets associated with a particular financial transaction instrument, it is contemplated that in general, some of the data sets stored on the financial transaction instrument have different owners. Furthermore, the storage of data sets is configured to facilitate independent storage and management of the data sets on the financial transaction instrument. Further still, the data sets may be stored in distinct differing formats provided by the distinct issuer or data set owner (also called "issuer," herein). The owners of data sets may include different individuals, entities, businesses, corporations, software; hardware, and/or the like. However, one skilled in the art will appreciate that the owners may also include different divisions or affiliates of the same corporation or entity.

As discussed above, many issuers of existing financial transaction instruments utilize predetermined formats for account numbers, data and/or applications stored in association with the financial transaction instrument. Similarly, the data storage media associated with these financial transaction instruments is typically configured to accommodate specific predetermined data formats. Thus, since the data format associated with a first issuer is often different from a data format of a second issuer, storage of multiple distinct data of differing formats on a single device provides complications for conventional systems. This is true since, each issuer typically maintains an account processing system that uses a processing protocol different from other issuers, and the information stored on the transaction card relative to the issuer must be formatted accordingly. As such, to ensure the security and integrity of the issuer-owned data, the loading of data on a transaction instrument is typically performed by an issuer or a third-party provider who typically uploads all related and similarly formatted data sets onto the transaction instrument. However, since the third party may typically only be authorized by the issuer to load issuer-owned data of similar format onto an issuer-provided transaction device, including differently formatted data sets on a single transaction device by the third party is often not permitted. More particularly, independent owners of data sets are often reluctant to conform their data set formats to a "standard format" because of the security advantages of maintaining a separate, distinct, often secreted format.

In contrast, and in accordance with an exemplary embodiment of the present invention, the format of the information stored in the present invention may vary from one data set to another. That is, the present invention permits the data to be stored on the financial transaction instrument in any format, and more particularly, in any format recognizable by the data owner/transaction instrument issuer. Thus, as noted, each data set may be used for a very wide variety of purposes including storage of applications, raw data, cookies, coupons, membership data, account balances, loyalty information, and/or the like.

In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, memory recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by a third issuer unrelated to the first and second issuers. Each of these three exemplary data sets may contain different information that is stored using different data storage formats and/or techniques. Further, each data set may contain subsets of data, which also may be distinct from other subsets.

Even further, where the invention contemplates the use of a self-service user interaction device. In this context, the self-service user interaction device may be any device suitable for interacting with a transaction instrument, and receiving information from the transaction instrument user and providing the information to a merchant, account issuer, account manager, data set owner, merchant point of sale, and the like. For example, the self-service user interaction device may be a stand-alone read write device, self-service Kiosk, merchant point of sale, read/write device, and the like. In one example, the self-service user interaction device may be configured to communicate information to and from the transaction device and to manipulate the data sets stored thereon. The self-service interaction device may be in communication with the various components of the invention using any communications protocol.

In general, systems and methods disclosed herein are configured to facilitate the loading of multiple distinct data sets onto a RF transaction device. With reference to FIG. 1, an exemplary method 100 according to the present invention is shown. Method 100 may include, for example, issuing a RF transaction device to a user (step 110), enrolling multiple data set owners in a multiple account transaction device program (step 112), presenting the transaction device (step 114), and loading distinct data sets onto the transaction device, where the data sets may be owned by unrelated account issuers (step 116). Once the data is appropriately loaded, the RF transaction device user may present the RF transaction device to a merchant system for completion of a transaction (step 122).

The system may be further configured such that, during an exemplary transaction, data sets associated with the financial transaction instrument may be managed. For example, the user may be prompted (e.g., on a screen, by electronic voice, by a store clerk, by a signal and/or the like) as to the possibility of adding, for example, a loyalty account to the same financial transaction instrument and the user may also be presented with terms and/or conditions in a similar or different manner. The user may be prompted at any time during the transaction, but the user may be prompted at the completion of the transaction. If the user accepts the invitation to add data to the financial transaction instrument, a new data set may be added (step 116). If the data is to be added, the stand-alone device may be configured to provide any account information (e.g., account identifier, security code, data owner routing number, etc.) to the transaction device for storage thereon. The stand-alone may locate an appropriate database location on transaction instrument for storing the added data. The stand-alone device facilitates storage of the data in a distinct location on the transaction device database, where the data is stored independently of any other data. In an exemplary embodiment, the data is added to a database location on the transaction device, which is reserved for independently storing all data owned by a particular data set owner. Alternatively, the data may be stored in a distinct location on the transaction device, which is a separate location than is used to store any other data set. Further still, the data set is stored in accordance with any storage protocol permitting the data to be stored and retrieved independently of other data.

The adding of the data may be verified by the issuer prior to making the modifications. The issuer may verify the data by, for example, running a verifying protocol for determining if the information is properly stored or formatted. If verified, all databases containing the data set to be updated or a mirror image of the data set to be updated are modified in accordance with the user or issuer provided instructions, and/or the issuer defined data storage protocol or format.

In one exemplary embodiment, multiple account issuers may be enrolled in a multiple account management program using a financial transaction instrument in accordance with the invention (step 112). For example, permission for adding account issuer owned data may be obtained from the data set owner. The data set owner may then be requested to provide account information to be stored on a transaction instrument. The data set owner may then provide account information relative to a distinct user account for loading onto the transaction instrument in accordance with the present invention. The issuers may be enrolled prior to issuance of the instrument or the issuers may be enrolled after issuance. By enrolling in the management program, the issuer may provide authorization for including the issuer-owned data on the financial transaction instrument. The issuer-owned data may be included (e.g., added) on the transaction instrument using a stand-alone interaction device, merchant system, or user personal computer interface upon presentment of the transaction device to the stand-alone interaction device 290 (step 114). The stand-alone interaction device may add the issuer-owned data while preserving a format recognizable by an issuer account management system. For example, the stand-alone device may identify an appropriate header or trailer associated with the data and adds the data accordingly. The stand-alone may add the data using any adding instruction or protocol as provided by the data set owner so that the resulting added data is stored in a format recognizable by the data set owner system. In this way, the stand-alone device may add the data while maintaining the data set owner's format. Alternatively, the interaction device may store the issuer-owned data on the transaction instrument in any format, provided that the issuer-owned data is provided to the issuer system (or to merchant system) in an issuer system (or merchant system) recognizable format.

It should be noted, that the financial transaction instrument may be issued with or without one or more data sets stored thereon. The financial transaction instrument may be issued using various techniques and practices now known or hereinafter developed wherein an instrument is prepared (e.g., embossed and/or loaded with data) and made available to a user for effecting transactions. Although the present invention may contemplate adding data sets (step 120) before issuing a financial transaction instrument (step 110), in various exemplary embodiments, by way of illustration, the data sets are described herein as being added (step 120) after issuance (step 110).

At any time after issuance (step 110) of the financial transaction instrument, or when the data is successfully added (step 116), the financial transaction instrument may be used in a commercial transaction. In one exemplary embodiment of the present invention, a user communicates with a merchant, indicates a desire to participate in an issuer provided consumer program. The user may communicate with the merchant by, for example, presenting the transaction instrument to the merchant and indicting a desire to complete a transaction. The user may indicate his desire to complete a transaction using any conventional process used by the merchant. The user may further indicate that the user wishes to complete the transaction using the financial transaction instrument.

During completion of the transaction, the user may present the financial transaction instrument to a merchant system (step 122). The financial transaction instrument is configured to communicate with the merchant, using any conventional method for facilitating a transaction over a network.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set (e.g., ADD, LOADED, INITIALIZED, READY, BLOCKED, ACTIVE, INACTIVE). Subsequent bytes of data may be used to indicate for example, the identity of the issuer, user, transaction/membership account identifier, or the like. The use condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing data sets. In one example, the data set annotation indicates that only the data set owner or the user are permitted to access or add a data set, various identified merchants are permitted to access the data set for reading, and others are altogether excluded from accessing the data set. However, other access restriction parameters may also be used allowing various entities to access a data set with various permission levels as appropriate.

The data, including the header or trailer may be received from a data set owner via any communication method described herein. The header or trailer may be appended to a data set to be modified, added or deleted, to indicate the action to be taken relative to the data set. The data set owner may provide the to a stand-alone interaction device configured to add the data in accordance with the header or trailer. As such, in one exemplary embodiment, the header or trailer is not stored on the transaction device along with the associated issuer-owned data but instead the appropriate action may be taken by providing to the transaction instrument user at the stand-alone device, the appropriate option for the action to be taken. However, the present invention contemplates a data storage arrangement wherein the header or trailer, or header or trailer history, of the data is stored on the transaction instrument in relation to the appropriate data.

In various exemplary embodiments, the step of adding data sets may be repeated. For example, first, second, and additional data sets may be added (step 130) to the financial transaction instrument in any order. In one exemplary embodiment of the present invention, the first data set is owned by a first data set owner (i.e., first issuer) and the second data set is owned by a second data set owner (i.e., second issuer).

For example, permission for adding account issuer owned data may be obtained from the data set owner. The data set owner may then be requested to provide account information to be stored on a transaction instrument. The data set owner may then provide account information relative to a distinct user account for loading onto the transaction instrument in accordance with the present invention. The issuers may be enrolled prior to issuance of the instrument or the issuers may be enrolled after issuance. By enrolling in the management program, the issuer may provide authorization for including the issuer-owned data on the financial transaction instrument. The issuer-owned data may be included (e.g., added, deleted, modified, augmented, etc.) on the transaction instrument using a stand-alone interaction device, merchant system, or user personal computer interface upon presentment of the transaction device to the stand-alone interaction device 290 (step 114). The stand-alone interaction device may manipulate the issuer-owned data while preserving a format recognizable by an issuer account management system. For example, the stand-alone device may identify the appropriate header or trailer associated with the data and add, delete or modify the data accordingly. The stand-alone may manipulate the data using any manipulation instruction or protocol as provided by the data set owner so that the resulting manipulated data is in a format recognizable by the data set owner system. In this way, the stand-alone device may manipulate the data while maintaining the data set owner's format. Alternatively, the interaction device may store the issuer-owned data on the transaction instrument in any format, provided that the issuer-owned data is provided to the issuer system (or to merchant system) in an issuer system (or merchant system) recognizable format.

It should be noted, that the financial transaction instrument may be issued with or without one or more data sets stored thereon. The financial transaction instrument may be issued using various techniques and practices now known or hereinafter developed wherein an instrument is prepared (e.g., embossed and/or loaded with data) and made available to a user for effecting transactions. Although the present invention may contemplate adding data sets (step 130) before issuing a financial transaction instrument (step 110), in various exemplary embodiments, by way of illustration, the data sets are described herein as being added (step 116) after issuance (step 110).

It should be noted, that the RF transaction device may be issued with or without one or more data sets stored thereon. The RF transaction device may be issued using various techniques and practices now known or hereinafter developed wherein a device is prepared (e.g., embossed and/or loaded with data) and made available to a user for effecting transactions. Although the present invention may contemplate loading data sets onto the transaction device (step 120) before or during issuance of a RF transaction device (step 110), in various exemplary embodiments, by way of illustration, the data sets are described herein as being loaded after issuance.

At any time after issuance (step 110) of the financial transaction instrument, the financial transaction instrument may be used in a commercial transaction. In one exemplary embodiment of the present invention, a user communicates with a merchant, indicates a desire to participate in an issuer provided consumer program. The user may communicate with the merchant by, for example, presenting the transaction instrument to the merchant and indicting a desire to complete a transaction. The user may indicate his desire to complete a transaction using any conventional process used by the merchant. The user may further indicate that the user wishes to complete the transaction using the financial transaction instrument.

During completion of the transaction, the user may present the financial transaction instrument to a merchant system The financial transaction instrument is configured to communicate with the merchant, using any conventional method for facilitating a transaction over a network.

The RF transaction device (e.g., smart card, magnetic stripe card, bar code card, optical card, biometric device, radio frequency card or transponder and/or the like) may communicate, to the merchant, information from one or more data sets associated with the RF transaction device. In one example, membership data and credit card data associated with an account or card may be transmitted using any conventional protocol for transmission and/or retrieval of information from an account or associated transaction card (e.g., credit, debit, loyalty, etc.). In one exemplary embodiment, the transaction device may be configured to communicate via RF signals. As such, the data contained on the device may be communicated via radio frequency signals.

Figure 2:
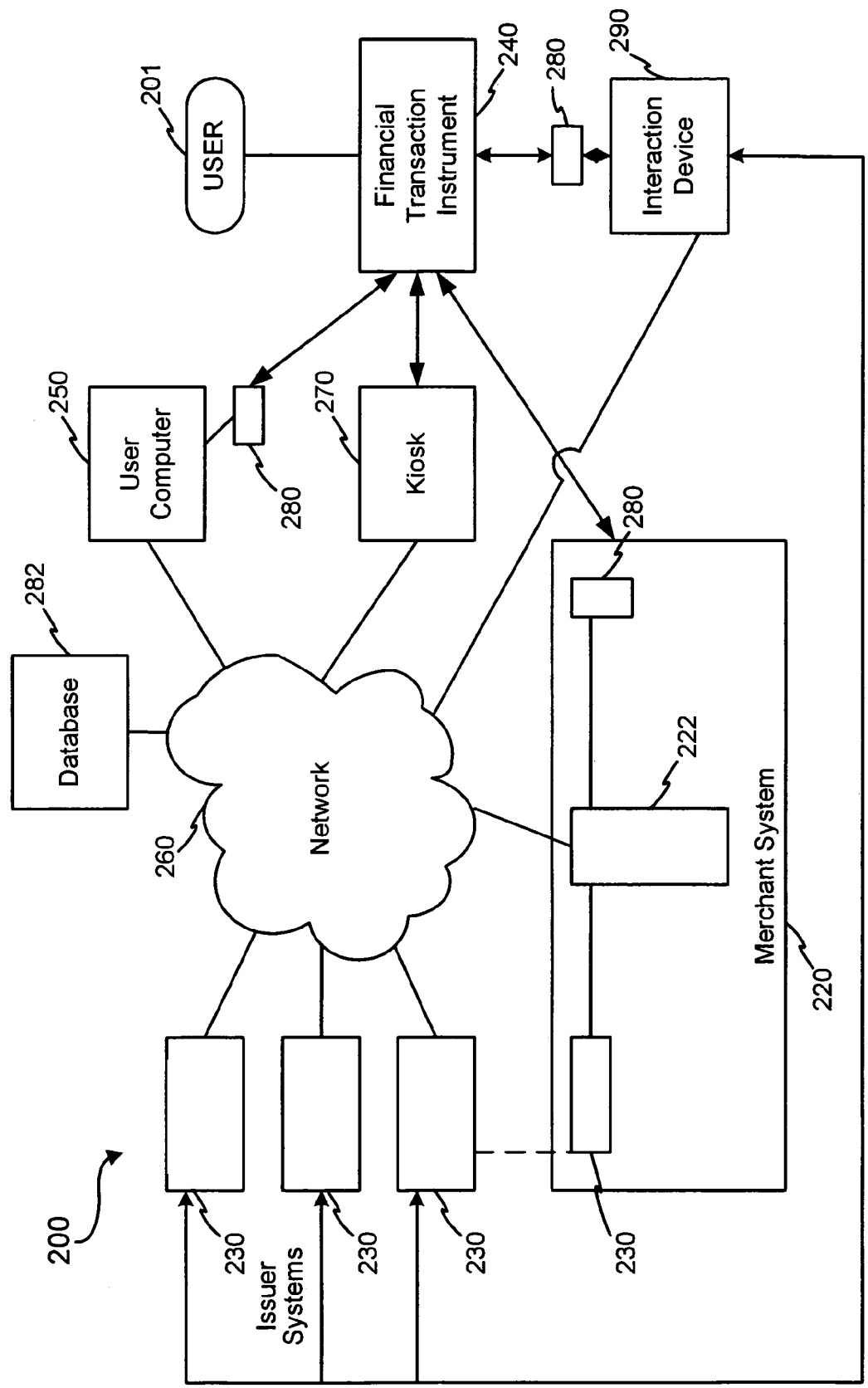
FIG. 2 illustrates a block diagram overview of an exemplary system for loading distinct data sets on a RF transaction device in accordance with an exemplary embodiment of the present invention.

With reference now to FIG. 2, in one exemplary embodiment of the present invention, a multiple data set transaction device system ("management system") 200 comprises, for example, a merchant system 220, various issuer systems 230, and a RF transaction device 240. Management system 200 may further be accessed by a user 201 on a user computer 250 or via a transaction device such as, for example, kiosk 270, stand-alone interaction device 290, automated teller, or the like. In these examples, communications between user computer 250 or kiosk 270 and merchant system 220 or issuer systems 230 may take place via, for example, a network 260. In various embodiments, merchant system. 220, user computer 250 and/or kiosk 270 are configured to communicate with RF transaction device 240. For example, communication with the RF transaction device 240 may be facilitated by a read/write device 280, such as a merchant point of sale, merchant RFID reader, computer interface, or the like, configured to receive information provided by the RF transaction device 240.

In general, merchant system 220 is configured to interact with a user 201 attempting to complete a transaction, and to communicate transaction data to one or more of issuer systems 230. Issuer systems 230 are configured to interact with RF transaction device 240 to receive and/or exchange data facilitating a transaction. Merchant system 220 may be operated, controlled and/or facilitated by any merchant that accepts payment via a transaction device. Merchant system 220 is configured to facilitate interaction with user 201, which may be any person, entity, software and/or hardware. The user 201 may communicate with the merchant in person (e.g., at the box office), or electronically (e.g., from a user computer 250 via network 260). During the interaction, the merchant may offer goods and/or services to the user 201. The merchant may also offer the user 201 the option of completing the transaction using a RF transaction device 240. Merchant system 220 may include a computer system 222 that may offer the option via a suitable website, web pages or other Internet-based graphical user interface that is accessible by users. The term "webpage" as it is used herein is not meant to limit the type of documents and applications that might be used to interact with the user. Any type of user interface wherein the user may be provided options for adding data to the transaction device may be used.

Each user 201 may be equipped with a computing system to facilitate online commerce transactions. For example, the user 201 may have a computing unit in the form of a personal computer (e.g., user computer 250), although other types of computing units may be used including laptops, notebooks, hand held computers, set-top boxes, and/or the like. The merchant system 220 may have a computing unit 222 implemented in the form of a computer-server, although other implementations are possible. The issuer system 230 may have a computing center such as a mainframe computer. However, the issuer computing center may be implemented in other forms, such as a mini-computer, a PC server, a network set of computers, or the like.

Issuer system 230 may be configured to manipulate a transaction account associated with the corresponding issuer-owned data stored on the transaction device 240 (or database 282, discussed below) in accordance with a related transaction. For example, the issuer system 230 may receive "transaction information" and manipulate an account status or balance in accordance with the information received. In accordance with the transaction amount, the issuer system 230 may, for example, diminish a value available for completing a transaction associated with the account, or the issuer system 230 may alter the information relative to the account user (e.g., demographics, personal information, etc.).

It should be noted that issuer systems 230 may also be configured to interact with RF transaction device 240, directly or indirectly via stand-alone interaction device 290, to individually provide data sets for loading on RF transaction device 240. In some embodiments, the data sets may be provided to the stand-alone device 290 via network 260 for storing on RF transaction device 240 when the transaction device is presented. In other embodiments, issuer systems 230 may store data set information within their own systems, which may communicate with the RF transaction device via user computer 250, kiosk 270, or merchant system 220. In the embodiments described, the issuer system 230 may be configured to push the data set to the RF transaction device 240, via the stand-alone interaction device 240 or the merchant system 220, kiosk 270, interaction device 290 or computer 250 which may be configured to pull such information from the issuer system 230.

In addition, the data may be loaded onto the transaction device 240 using, for example, a stand-alone interaction device 290 configured to communicate with at least one of the issuer systems 230 which may or may not be configured to communicate with a merchant system 220. The interaction device 290 may communicate with the issuer systems 230 using any of the aforementioned communication protocols, techniques and data links. The communication between the stand-alone interaction device 290 and the issuer system 230 may be facilitated by a network 260. In an exemplary embodiment, the network 260 may be secure against unauthorized eavesdropping.

Interaction device 290 may provide instructions to the issuer systems 230 for requesting receipt of issuer-owned data, such as for example, account data, user member identification data, member demographic data, or the like, which the issuer wishes to store on the financial transaction instrument 240. The interaction device 290 may communicate with the issuer systems 230 using an issuer recognizable communications protocol, language, methods of communication and the like, for providing and receiving data. In one exemplary embodiment, issuer-owned data is received by the interaction device 290 from issuer systems 230, and stored onto the financial transaction instrument 240. The data may be stored or manipulated in accordance with the issuer provided instructions, protocol, storage format, header or trailers received by the interaction device from issuer systems 230. The issuer-owned data may be stored on the financial transaction device 240 in any format recognizable by a merchant system 280, and further recognizable by issuer system 230. In one exemplary embodiment, the issuer owned data is stored using a issuer system 230 format which may be later formatted in merchant system 280 recognizable protocol when provided to the merchant system 280. In one embodiment, the issuer-owned information is stored on the financial transaction instrument 240 in the identical format with which it was provided by the issuer system 230. In that regard, interaction device 290 may be any device configured to receive issuer-owned data from an issuer system 230, and write the data to a database, such as, for example, a database on instrument 240 or database 282. Further, as described more fully below, the issuer-owned information may also be provided by the issuer 230 to a remote database 282 where the information is stored such that it mirrors the corresponding information stored on the transaction instrument 240.

As noted, in accordance with the invention, a transaction device is provided which permits the storage and presentment of at least one of a plurality of data sets for completing a transaction. In one exemplary embodiment, the interaction device 290 may be configured to add the issuer-owned data to the transaction device when the transaction device 240 is initially configured, prior to providing the transaction device 240 to the user 201. The interaction device 290 may additionally be configured to add additional distinct data sets owned by other distinct issuers on the transaction device 240 when the transaction device 240 is next presented, for example, to the stand-alone interaction device 290. In this regard, the interaction device 290 may receive from multiple distinct issuer systems 230, via the network 260, the issuer provided protocol/instructions and additionally may load the additional distinct data sets on the transaction device 240 in real-time, substantially real-time, or in a batch processing mode. The additions may be provided to the interaction device 290 for storage and later use when the transaction device 240 is next presented. Alternatively, the interaction device 290 may be configured to retrieve the instructions from the issuer system 230 when the transaction device 240 is next presented to interaction device 290, on a random basis, during a predetermined time period (e.g., every presentment for the next three days), at predetermined intervals (e.g., every third presentment) and/or the like. Similarly, any of the devices discussed herein may communicate or exchange data at similar time periods or intervals. Further, where other devices, such as, for example, a kiosk 270, merchant point of interaction device, or the like, are likewise configured to add the issuer data on transaction device 240, the invention contemplates that the real-time or substantially real-time adding of the above distinct data sets in similar manner as is described with the interaction device 290.

Alternatively, the device to which the transaction device 240 may be presented may not be equipped for adding the data to the transaction device 240. For example, merchant system 220 may be any conventional merchant system which communicates to an issuer system 230, and which permits a user 201 to complete a financial transaction, but which is not configured to add the issuer data contained on the transaction device 240. In general, conventional merchant systems are not configured to write or overwrite data included on the payment devices presented to the merchant system for processing. That is, the merchant system 220 may include little or no additional software to participate in an online transaction supported by network 260. Loading of the data sets on transaction device 240 may be performed independent of the operation of the merchant system 220 (e.g., via issuer system 230 or interaction device 290). As such, the present invention may not include retrofitting of the merchant system 220, to accommodate system 200 operation. Thus, where the merchant system 220 is not configured to add the data on the transaction device 240, such additions of the data set may be made using the interaction device 290 or directly using an issuer system 230 as described above.

The merchant system 220, kiosk 270, interaction device 290, may include additional components or methods for permitting the transaction device user 201 to self-add the data onto the transaction device 240. In this case, the systems 220, 270, and 290 may include an additional user interface for use by the user 201 to identify the adding action to be taken. Where the systems 220, 270, and 290 are configured to communicate with the transaction device 240 and to add the data sets thereon, the additions may be completed or substantially completed in real-time or substantially real-time. For example, the user 201 may present the transaction device 240 to one of the systems 220, 270, or 290, provide instructions (e.g., "ADD DATA SET") for adding the data on transaction device 240 to the system 220, 270, or 290, and system 220, 270, or 290 may add the data onto the transaction device 240 in real-time or substantially real-time, for example, prior to permitting the transaction device 240 to be used by the user 201 to complete a transaction. Alternatively, the instructions for adding data sets may be provided by the user 201 to the merchant system 220 or kiosk 270, and the merchant system 220 or kiosk 270 may further provide the instructions to the network 260 for use in later adding the data. For example, the instructions may be provided by system 220 or 270 to the issuer system 230 managed by the issuer-owning the data to be added. The issuer system 230 may provide the data sets to be added to, for example, interaction device 290, for updating the transaction device 240 when next presented. In one exemplary embodiment, the instructions may be stored at the issuer system 230, until such time as the transaction device 240 is next presented to a device configured to add the data on the transaction device 240. Once presented, the data set may be provided to the device (e.g., computer 250, interaction device 290, etc.) for storing the data set on the transaction device 240.

In another exemplary embodiment, the user 201 may self-manage the data sets by, for example, adding data sets using a conventional computer system 250, which may be in communication with the network 260. Computer system 250 may or may not be configured to interact with RF transaction device 240. Where the computer system 250 is not configured to interact with the transaction device 240, the user 201 may provide instructions for adding data sets to the issuer system 230 for later use in adding data to the corresponding transaction device 240 data, for example, when the transaction device 240 is next presented in similar manner as described above. Where the computer 250 is configured to interact with the RF transaction device 240 to modify the data stored thereon, the user 201 may provide instructions to the computer 250 for adding the data on the RF transaction device in real-time or substantially real-time. Consequently, the computer 250 may receive adding instructions from the user 201 and perform the additions accordingly, and may add the data to the transaction device 240 in real-time or substantially real-time. The computer 250 may additionally be configured to receive authorization of the adding instructions from issuer system 230 prior to making the user 201 requested additions. The issuer system 230 may receive the user 201 instructions and verify whether the identified additions of data sets are available to the user 201 or if the identified data sets are valid. If the identified additions and data sets are authorized, the issuer system 230 may add the data to a transaction device database including a distinct data storage area associated with the issuer system.230. Any management of the data sets discussed herein may include authorizations, restrictions or levels of access as is known in the art.

In one exemplary method of self-management, a user 201 logs onto a website via user computer 250, or onto a stand-alone device, such as, for example, interaction device 290 or kiosk 270, and selects an option for adding data sets on a RF transaction device 240. The additions or requested additions may be transmitted to the transaction device 240 via a reader/writer device 280 configured to communicate the data to transaction device 240. In this context, the reader/writer device 280 may be any conventional transaction device reader or writer.

A transaction device database in accordance with the present invention may be any type of database, such as relational, hierarchical, object-oriented, and/or the like. Common database products that may be used to implement the databases include DB2by IBM (White Plains, N.Y.), any of the database products available from Oracle Corporation (Redwood Shores, Calif.), Microsoft Access or MSSQL by Microsoft Corporation (Redmond, Wash.), or any other database product. A database may be organized in any suitable manner, including as data tables or lookup tables. Association of certain data may be accomplished through any data association technique known and/or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables may be the same. However, data tables having similar, though not identical, data in the key fields may also be merged by using AGREP, for example.

As noted, in some exemplary embodiments of invention, authorization may be obtained from issuer systems 230 prior to adding, deleting or manipulating the data on transaction device 240. Authorization may be obtained by requesting the authorization during the process of adding the data sets to-the transaction device 240. Authorization may be given where the user 201 provides appropriate security information, which is verified by the issuer system 230. The security information may be, for example, a security code granting access to the issuer-owned data on the transaction device 240. For example, a point-of-sale machine may be configured to allow the input of a code, or an answer to a prompt, which is provided to and verified by issuer system 230. Once verified the addition of data requested may be made to the data contained on the RF transaction device.

It should be noted that the authorization code may be used to permit the user 201 to select which issuer provided data to utilize for completion of a transaction. For example, a point of interaction device (POI) device may be programmed to search the RF transaction device for a data set containing a particular club membership data set, or to locate all available data sets for providing to a user 201 display available data sets to the user 201, thereby permitting the user 201 to select which data set to use to complete a transaction. If no data set is found, the POI device may alert the user 201 or prompt the merchant to alert the user 201 of the possibility of adding issuer-owned data to the RF transaction device. A positive response to this alert may cause the POI device to add an issuer data set to the transaction device. Additional security on the transaction device 240 may prevent access to certain data by any parties discussed herein.

It is noted that the user 201 may already be a member of a membership program managed by an issuer system 230 in which case the associated user 201 membership data may be assigned to user 201 for inclusion on transaction device 240. As such, the user 201 may be permitted to add the membership data set to the transaction device 240. Alternatively, the user 201 may become a member by selecting to add the membership information to the RF transaction device, using the interactive device 290. In some embodiments, changes made to the data sets stored on the transaction device 240 may be updated to the RF transaction device 240 in real-time or substantially real-time, where the interactive device 290 is in communication with the transaction device 240. The changes may also be completed the next time the user 201 presents the RF transaction device 240 to a stand-alone interaction device 290 or to a kiosk 270, merchant system 220, or the like.

In another exemplary embodiment of the present invention, merchant system 220, kiosk 270, and/or user computer 250 may be configured to interact with RF transaction device 240 via a read/write device 280. Read/write device 280 may be any device configured to communicate with RF transaction device 240. In one embodiment, read/write device 280 is configured to read and write to RF transaction device 240. For example, read/write device 280 may be a point of interaction magnetic card reader/writer. In another example, where the transaction device includes a RF transmitter/receiver for communicating with system 200, read/write device 280 may include a mating transponder configured to receive and transmit issuer-owned data. Read/write device 280 may be configured to select data sets for use by a merchant using any suitable selection technique including but not limited to proprietary commands or command sequences or use of ISO/IEC 7816-4 application selection sequences (e.g., GET command).

Figure 3:
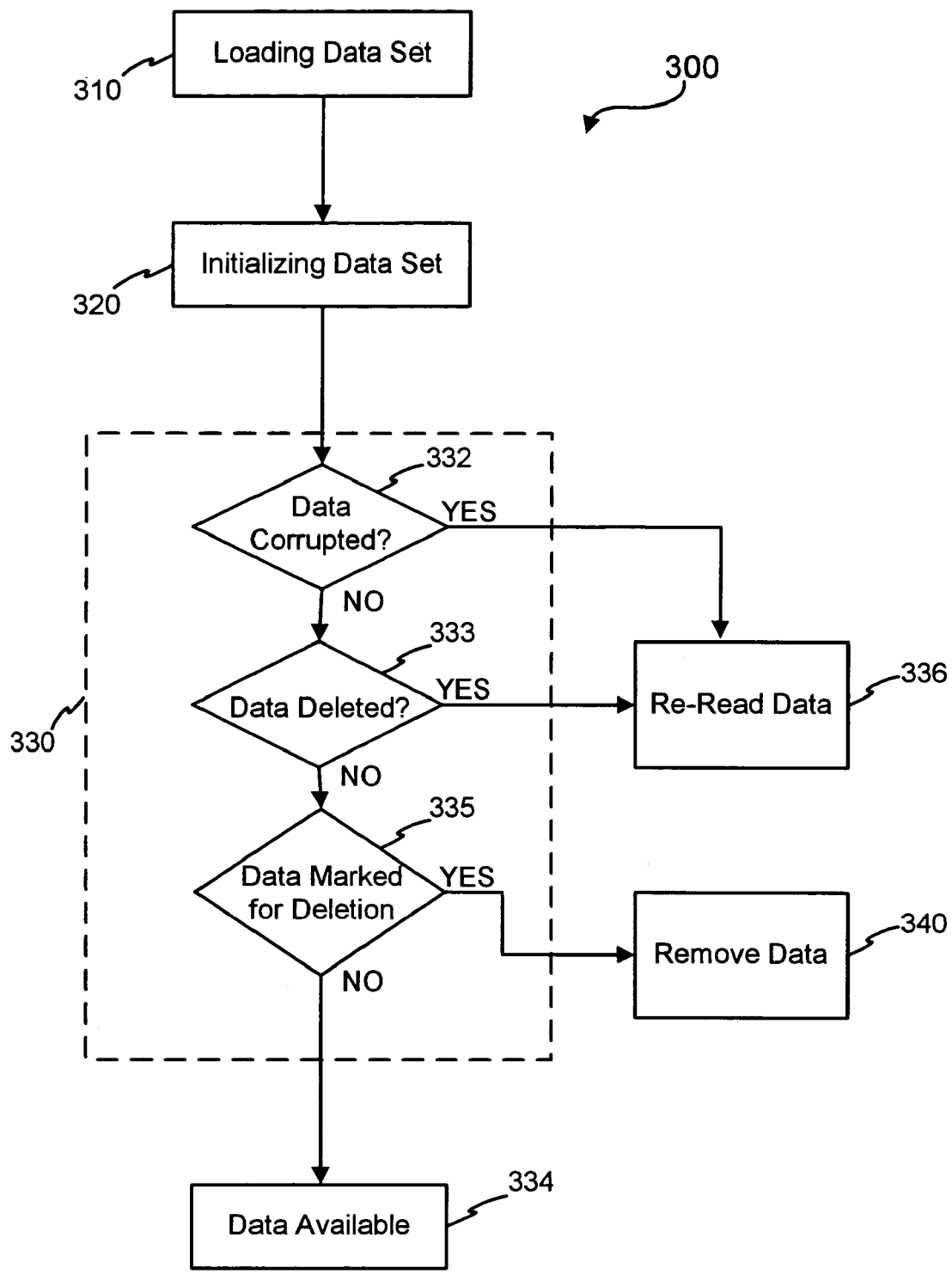
FIG. 3 illustrates a more detailed exemplary method for loading distinct data sets on a RF transaction device in accordance with an exemplary embodiment of the present invention.

Managing of the data sets (step 116) as used herein may include adding the data sets to the transaction device 240 database. More particularly, FIG. 3 illustrates a general overview of an exemplary data set management method 300 comprising the steps of loading a data set (step 310), initializing a data set (step 320), and verifying availability of data set (step 330). In this manner, a data set may be added to a RF transaction device, initialized and verified for usage in the completion of a transaction. Furthermore, the ability to update, modify, replace and/or delete a data set may be subject to security requirements.

In one embodiment exemplifying self-management of the transaction device database, the various processes may include a user 201 facilitating the input of information into a data management system 200 to cause the data set to be loaded. The information may be inputted via keypad, magnetic stripe, smart card, electronic pointer, touchpad and/or the like, into a user computer 250, POS terminal, kiosk 270, ATM terminal and/or directly into the merchant system 220 via a similar terminal or computer associated with merchant server 222. The information may be transmitted via any network 260 discussed herein to merchant system 220 or issuer systems 230. In another embodiment, the merchant may enter the information into an issuer system 230 on behalf of the user 201. This may occur, for example, when the user 201 and/or issuer system 230 authorizes the management of data sets on RF transaction device 240 over a telephone and the service representative inputs the information. In this embodiment, the transaction device 240 may be updated at the next presentment opportunity.

Any suitable procedures may be utilized to determine whether a data set is currently ready for use and available (step 330). In one example, when a financial transaction device 240 is presented, the availability of the data set is verified by checking whether the data set has been corrupted or blocked (step 332), or deleted (step 333). For example, the data set may be checked to determine if the data set has been accessed or altered without permission ("corrupted") or if the data set exists or has been removed from the transaction device 240 ("deleted"). The check may be performed using any suitable protocol or comparing data. If the answer to these questions is no, then the data set is available and ready for use (step 334). If the data is corrupted or blocked, subroutines may be used to attempt to retry reading the data (step 336). If the data set is marked deleted or removable, subroutines will prevent access to the data set (step 335) and remove the data set (step 340). For example, a suitable subroutine may place a DELETE "marker" on the data set, which prevents the data from being transmitted during completion of a transaction. The data set may then be marked for deletion and deleted from the transaction device 240 at the next presentment of the device. In similar manner, where the data set is corrupted, a CORRUPTED marker may be appended to the data set and the data set is prevented from being transmitted during completion of a transaction. The marker may be a header or trailer as discussed herein.

Figure 4:
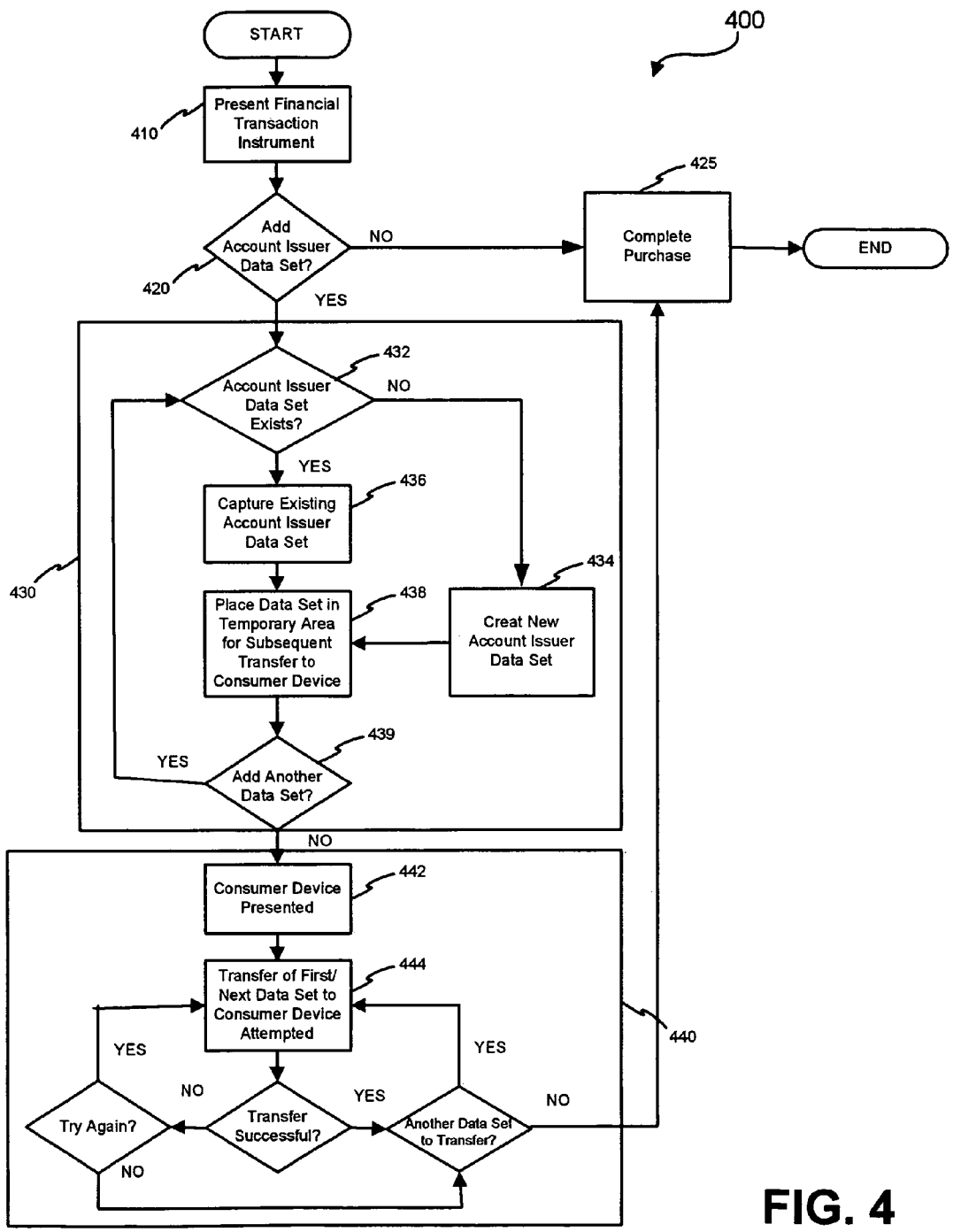
FIG. 4 illustrates an exemplary data set management method for adding data sets in accordance with an exemplary embodiment of the present invention.

Various methods may be used to add a data set to a financial transaction device 240 or to replace a data set on a financial transaction device 240. FIG. 4 illustrates an exemplary method of adding a data set to a financial transaction device 240, including the general steps of presenting the financial transaction instrument (step 410), verifying the addition of the data set to the financial transaction instrument (step 420), placing the data set in a temporary holding area (step 430), and adding the data set (step 440).

More particularly, the user 201 presents the financial transaction device 240 (step 410) to a device 280 configured to communicate with device 240. The user 201 may present financial transaction device 240 at a point of purchase or to an interaction device 240 or kiosk 270. For example, the user 201 may wave the RF transaction device 240 in front of a POI machine in a retail store, which is configured to receive data from the device 240. Alternatively, the user 201 may present the financial transaction device 240 at a self-service location such as a kiosk 270 in a mall. Moreover, the user 201 may present the financial transaction device 240 to a peripheral device associated with a personal computer, or the like.

The user 201 is then given the opportunity to add a data set to the transaction device 240. For example, device 280 may detect the absence of a particular data set on the transaction instrument by searching the transaction device 240 databases and comparing the existing data sets to the data set to be added. If the data set to be added is not found on the database, the user 201 may be prompted to confirm the addition of this data set to the instrument (step 420). The user may be prompted via an interactive user interface displaying the option to add the data set. In one example, when a user 201 presents a financial transaction device 240 to a merchant, the card reader detects the absence of a loyalty data set and provides a message on a display to the user 201 or the store clerk indicating that the loyalty data set can be added if desired. The user 201 may answer in the negative and complete the purchase using typical transaction methods (step 425). Alternatively, if user 201 provides an affirmative response, the algorithm may prepare a data set for communication with the financial transaction device 240 (step 430). The process may determine whether the data set (or information that could be used to create the data set) exists in some form or on some device other than on the financial transaction device 240 (step 432). Determining whether a data set exists may involve querying an issuer system 230, database 282, or the like: For example, the issuer system 230 may compare the data set to other data sets the issuer system 230 has assigned to a particular user 201. If the data set is not assigned to a particular user, then issuer system may determine that the data set is available for adding to the transaction device 240. Determining whether a data set exists may also take place when a store clerk verbally asks (or a screen prompts) the user 201 to present another card containing the information. For example, the data set may exist on a movie rental card and stored in magnetic stripe form, bar code, and/or the like.

If the data set exists in an accessible form, the data set may be captured (step 436). In this example, the user 201 may present the movie rental card and the data read from the movie rental card may then be stored in a data set associated with the financial transaction device 240. For example, the user 201 may desire to add a shopping loyalty card to the user's 201 financial transaction device 240. The user 201 may swipe, scan or otherwise present the loyalty card such that the data set from the loyalty card is captured. The system may be further configured such that the merchant, kiosk 270, or computer system may access an issuer system 230 to obtain information for creating the data set. Thus, if a user 201 does not have the movie rental card on the user's 201 person, the system 230 may prompt the clerk to request identifying/security information and to access the user's 201 account and therefore facilitate adding a movie rental data set associated with the user's 201 transaction device 240. Any other suitable methods of capturing data sets may also be used.

If the data set does not exist, a new data set may be created (step 434) for inclusion on the transaction device 240. Creation of the data set may, for example, involve filling out an application, providing name and address, creating an account, and/or the like. In either event, the pre-existing or newly created data set is temporarily held in a storage area (e.g., database 282, local memory or the like) for transfer to the transaction device 240 (step 438). Additional data sets may be prepared for transmittal to transaction device 240 (step 439).

In this exemplary embodiment, the transaction device 240 is presented again to read/write device 280 (step 442). Read/write device 280 is configured to attempt to transfer the data set(s) to the transaction device 240 (step 444). For example, existing read/write device 280 may be configured with software and/or hardware upgrades to transmit data to the transaction device 240. In one exemplary embodiment, if the data sets were not transferred correctly, the process may try the transfer again. In another exemplary embodiment, data sets are added one at a time or altogether. Thus, a user 201 may pass a card through a card reader/writer one or more times during the addition process. The transaction may be completed (step 425) using the new data set or another selected method of payment. The same steps may be used in a self-service embodiment, however, in one embodiment, no financial transaction takes place along with the addition of data sets. It should also be noted that under appropriate circumstances, a user 201 could add data sets at a point of purchase without actually completing a purchase.

In various exemplary embodiments, the user 201 and/or the owner of the data set may manage the data set (i.e., steps 432-439) in advance of presenting the transaction device 240. For example, a user 201 on user computer 250 may choose to add or delete data sets via a website configured for management of data sets. In another example, an issuer system 230 may add functionality to an account and may desire to update the data set associated with that account. In either example, data sets that have been prepared in advance may be ready for transmission upon presentment of the transaction device 240. The transmission of the data sets may be transparent to the user 201. For example, the user 201 may present the transaction device 240 (step 442) to complete a purchase and the waiting data sets may automatically be added to the user's 201 card (step 440).

Figure 5:
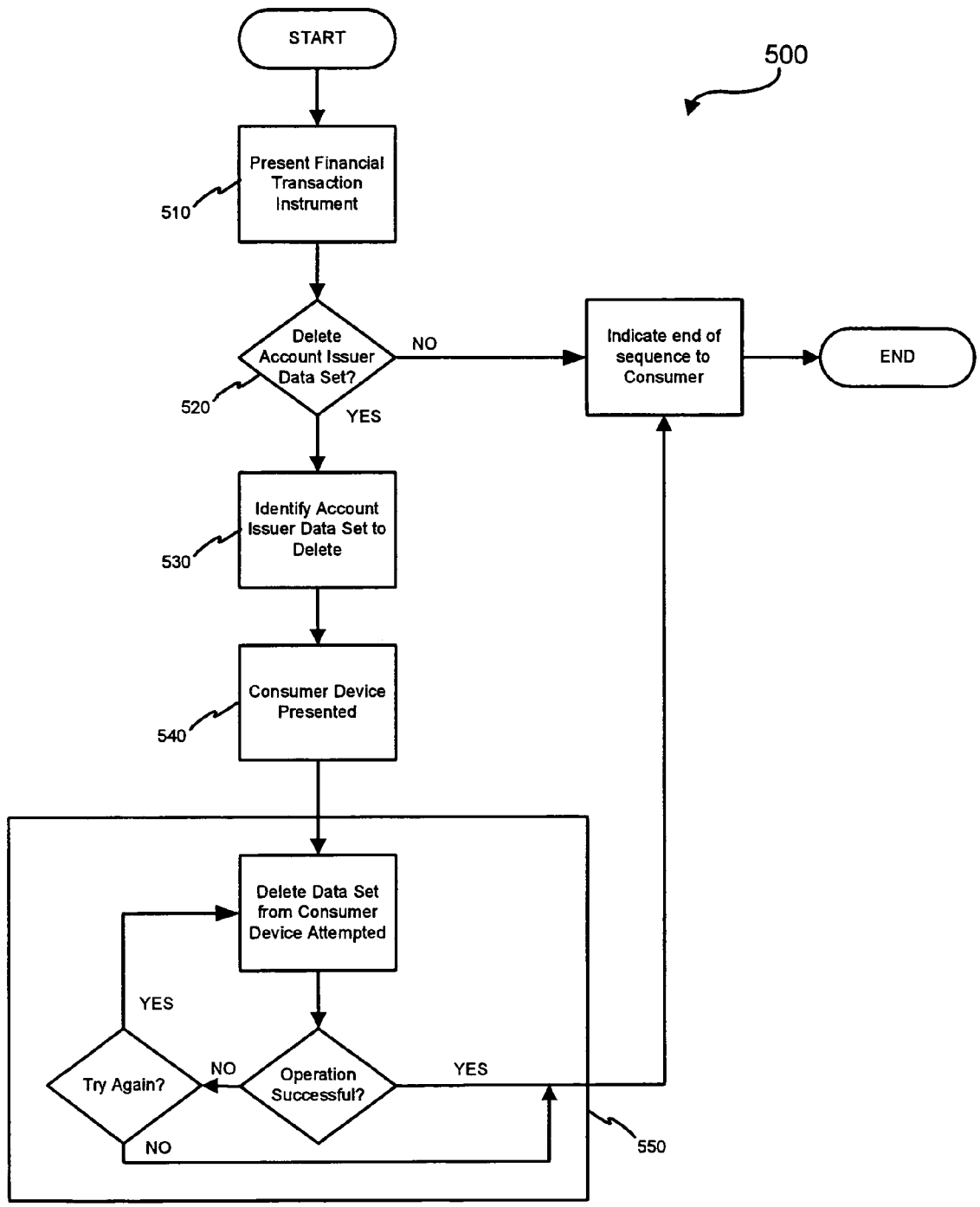
FIG. 5 illustrates an exemplary method for user self-management of data sets in accordance with an exemplary embodiment of the present invention.
Figure 6:
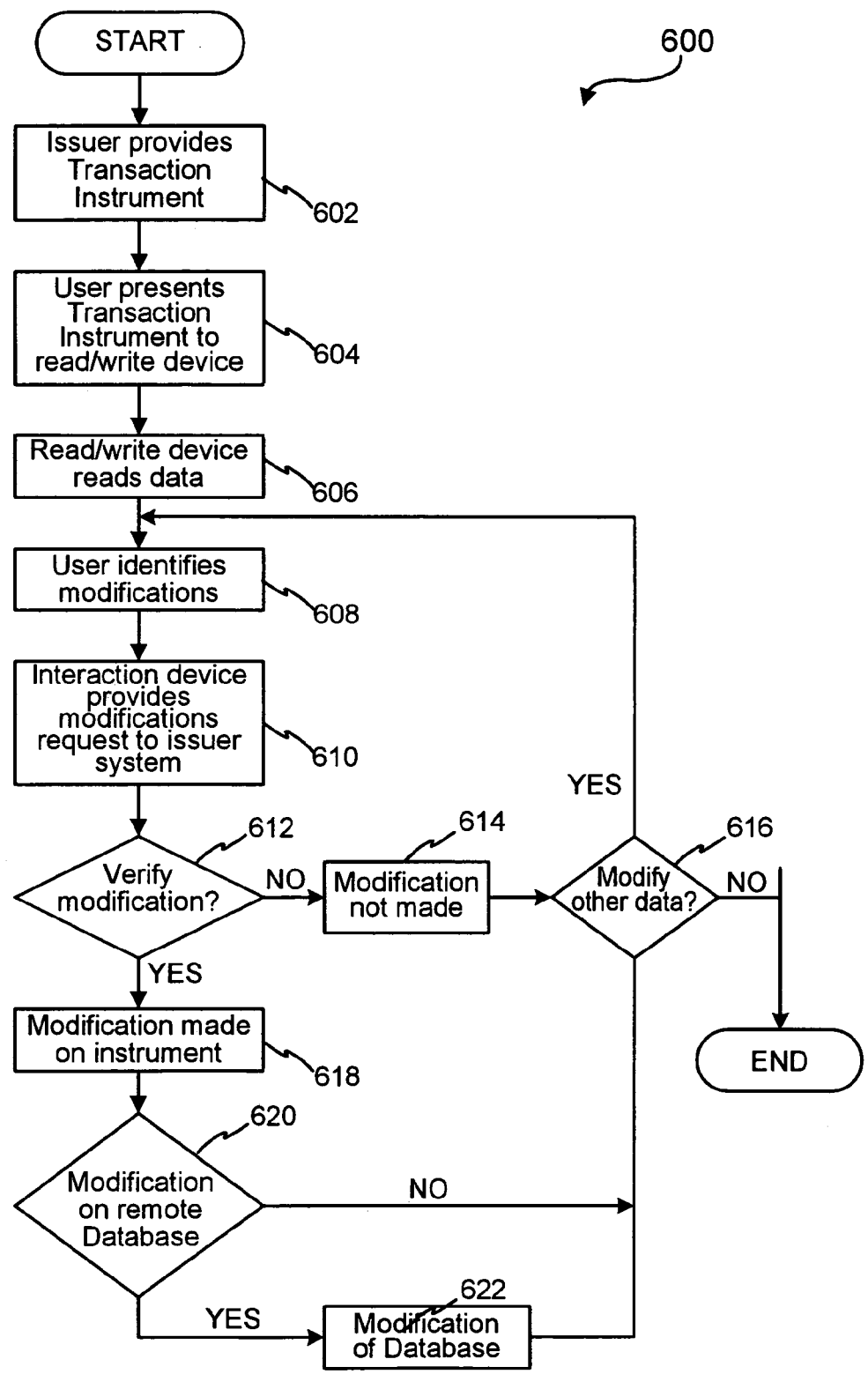
FIG. 6 illustrates an exemplary method for issuer management of data sets in accordance with the present invention.

As noted, the data associated with the transaction device 240 may be modified by the user 201 and/or by the issuer system 230. FIGS. 5 and 6 respectively, depict exemplary methods for user 201 and issuer system 230 data management. For example, with respect to user 201 self-management, the issuer system 230 may provide the user 201 with a transaction device 240 (step 502). The transaction device 240 may be provided with pre-stored issuer-owned data, or the device may be configured to permit the user 201 to add the data at a later date. The user 201 may then present the transaction device 240 to read/write device 280 for initiating the self-management process (step 504). The read/write device 280 may then read the data on the transaction device 240, and provide the data to an interaction device 290 for displaying to the user 201 (step 506). Alternatively, the interaction device 290 may provide the user 201 a list of available data to be added to the transaction device 240.

The user 201 may then be permitted to identify which data the user 201 wishes to add (step 508). Identification of the data may include providing the data with a trailer or header indicating the adding action to be taken. The header and an indicator of the data to be added may then be provided to the issuer system 230 (step 510) for verification as to whether such desired additions are available to the user 201 (step 512). If the desired additions are not available, the additions will not be made and the user 201 is notified accordingly (step 514). The user 201 may then be permitted to identify whether other data is to be added (step 516). If so (step 508), the interaction device 290 may provide a request for adding to the issuer system 230. (step 510) and the verification process is repeated.

Alternatively, where the issuer system 230 verifies that the additions of distinct data sets may be made (step 512), the interaction device 290 may provide instructions to the interaction device 290 to the appropriate data on the transaction device 240 (step 518). The user 201 may then be permitted to select other data sets to add (step 516), in similar manner as was described above. Where the addition of data sets is complete, the user 201 may then present the transaction device 240 to a merchant for use in completing a transaction.

FIG. 6 depicts an exemplary method wherein the issuer system 230 manages the data contained on the transaction device 240. For example, the issuer may identify on the issuer system 230 which data sets are to be added to the transaction device database (step 602). The device 240 may be provided with pre-stored issuer-owned data, or the instrument 240 may be configured to permit the user 201 to add the data at a later date. The user 201 may the present the transaction device 240 to read/write device 280 for initiating the self-management process (step 604). The read/write device 280 may then read the data on the transaction device 240, and provide the data to an interaction device 290 for displaying to the user 201 (step 606). Alternatively, the interaction device 290 may provide the user 201 a list of available data to be added to the instrument 240.

In addition, the issuer system 230 may query as to whether the issuer system 230 is in possession of the transaction device 240 for making the additions to the data set on the transaction device 240 in real-time or substantially real-time (step 608). If so, the additions are made accordingly (step 610) and the transaction device 240 may then be authorized for use in completing a transaction using the distinct data set added (step 612).

Where the issuer system 230 is not in possession of the transaction device 240 at the time the issuer determines that the addition of the distinct data sets on the transaction device 240 are to be made (step 608), the distinct data sets to be added may be made on the issuer system 230 (step 604), and may be placed in queue on the issuer system 230, for uploading to the transaction device 240 when it is next presented to the issuer system 230 or to an appropriate read/write device 280 (step 614). When the transaction device 240 is presented thusly (step 616), the issuer system 230 may be notified that the transaction device 240 is available for adding the identified distinct data sets, and the issuer system 230 may then provide the instructions for addition (e.g., modified data including headers) to the appropriate read/write device 280 for adding the data sets to the transaction device 240 (step 618). The transaction device 240 may then be provided to the user 201 for use in completing a transaction (step 612).

Figure 7:
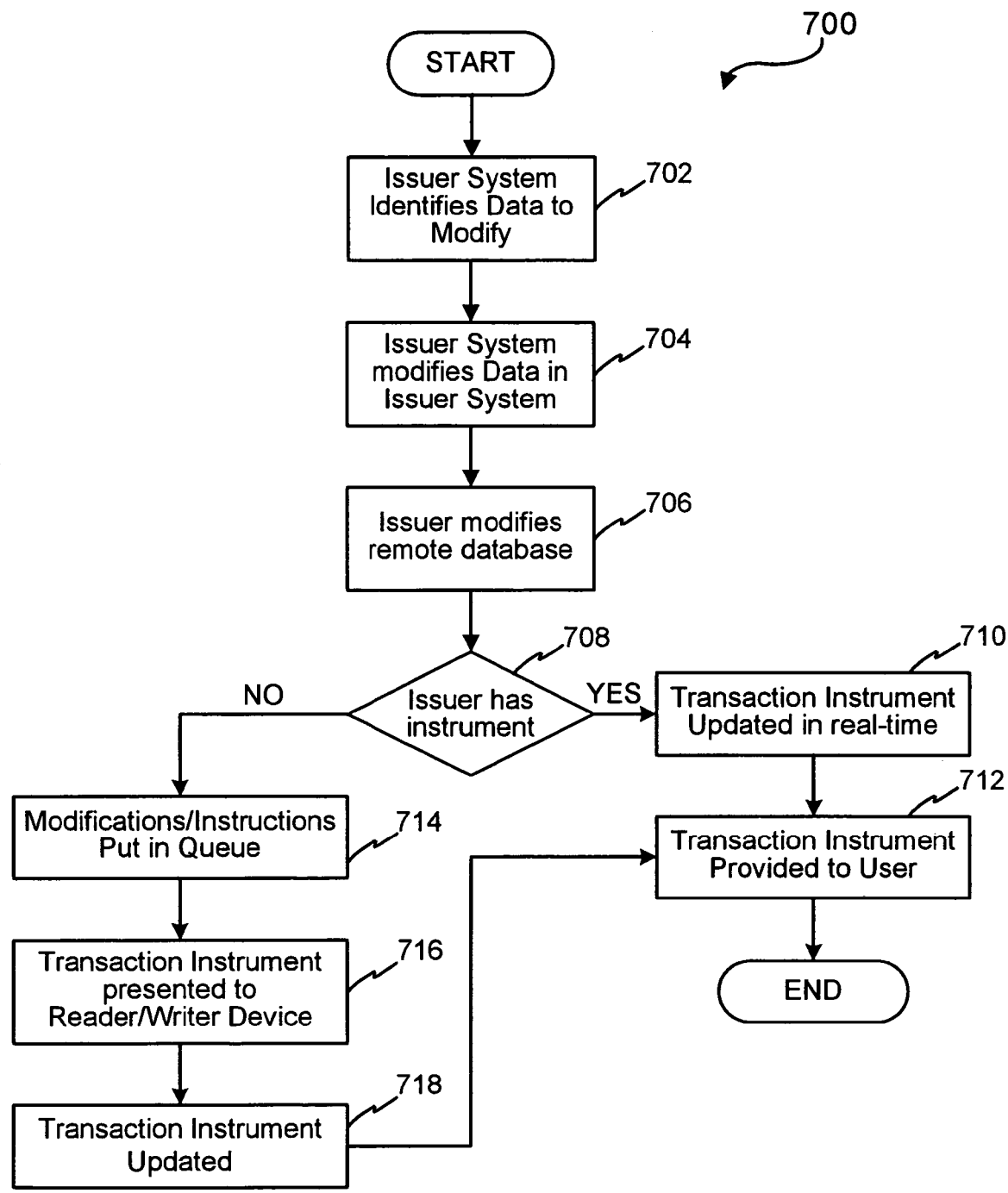
FIG. 7 illustrates an exemplary data set selection method for use in completing a transaction.

As noted, the transaction device 240 may include multiple data sets which correspond to distinct issuer systems 230, and which may be used to complete a transaction. The user 201 may be permitted to choose which data set to use for transaction completion. FIG. 7 illustrates an exemplary method by which the user 201 may choose which of the data sets to use to complete a transaction. For example, the user 201 may present the transaction device 240 to a merchant system for use in completing a transaction (step 702). The merchant system 220 may then read the data stored on the transaction device 240 and report to the user 201 all distinct data sets which may be used to complete a transaction (704). The user 201 may then select the appropriate data set (step 706) and the transaction is completed accordingly (step 708).

It should be noted that completion of a transaction may be performed under any business as usual standard employed by the merchant and/or issuer system 230. For example, the merchant server 222 may be configured to communicate transaction data to the appropriate issuer system 230, in real-time or substantially real-time, or by using batch processing at the end of each day. Any suitable means for delivering the transaction data to the issuer systems 230 may be used. In one exemplary embodiment of the present invention, the transaction data may be delivered to the issuer system 230 via a network 260. The issuer system 230 may receive the transaction information and process the transaction under issuer defined protocol independent of any other protocol used by other issuers to process a transaction. The issuer system 230 may receive the transaction data then provide the merchant with the appropriate satisfaction for the transaction.

In another exemplary embodiment, transaction device 240 may include calling card account numbers associated with a calling card account provided by a telephone local or long distance carrier. A "calling card," as used herein, allows a calling card user 201 (e.g., subscriber) to place toll calls while away from the home or office without having to bill the call to a third party or to continually insert coins into a public telephone. A typical calling card enables a user to dial a directory number of a called party and a calling card number to place a call. The "calling card" may also include the use of an account number to access any other service such as, for example, cable television service, pay per view content, fax service, internet access via an internet phone and the like. The account may also include account numbers from disparate service providers such as, for example, utility accounts, such that the fob may be used at the merchant to purchase and bill to that account. For example, a solar power device provider may enter into an agreement with a power company to allow customers to bill their device purchases to the power company.

Upon validation of the dialed calling card number by an host services system (HSS), a connection between the caller and the called party is established. The calling card subscriber is requested to subsequently pay for the telephone call (and all other calls placed during a predetermined period) upon receiving an itemized calling card bill.

Figure 8:
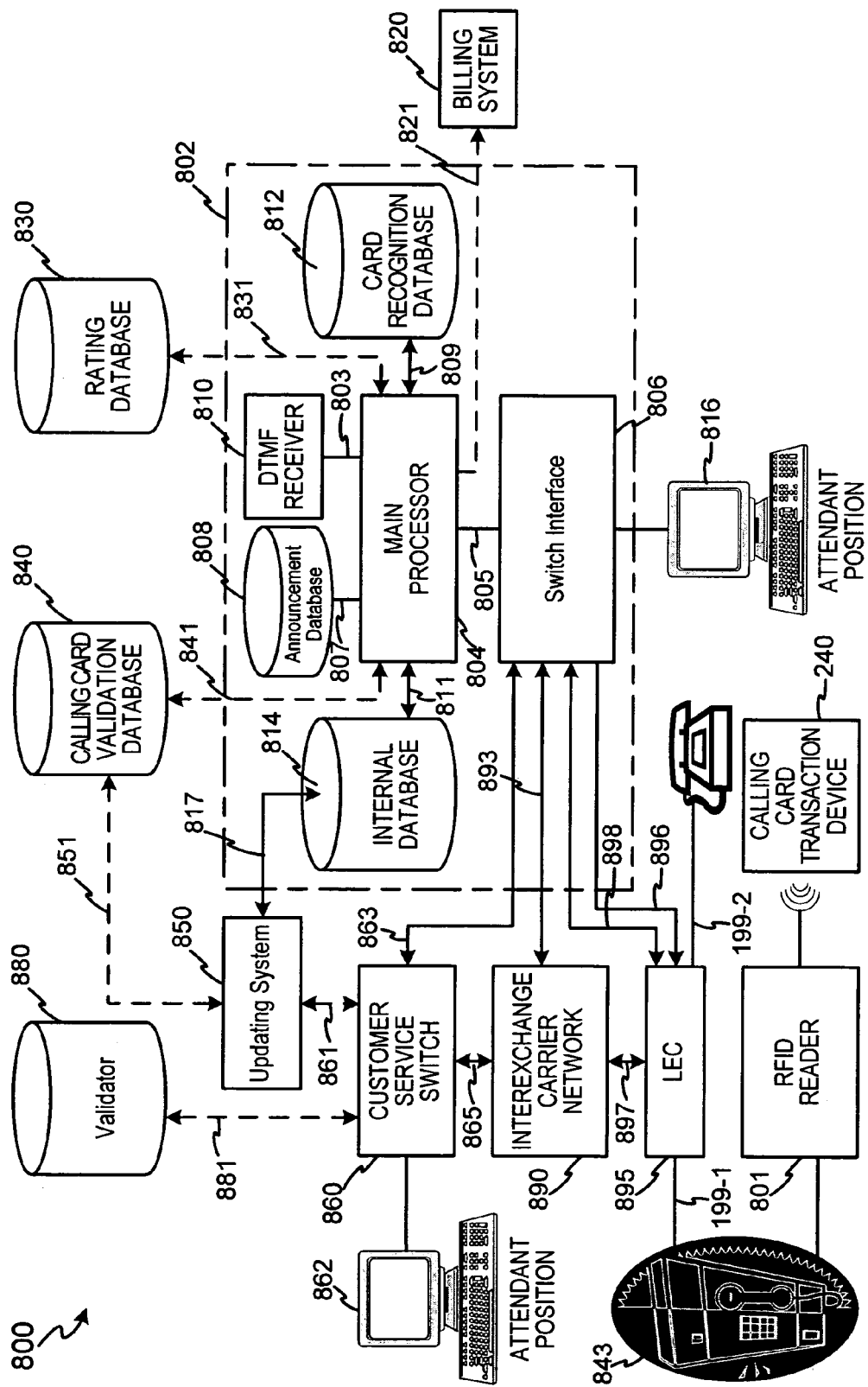
FIG. 8 illustrates an exemplary calling card transaction system for use in completing a calling card transaction in accordance with the present invention.
Figure 9:
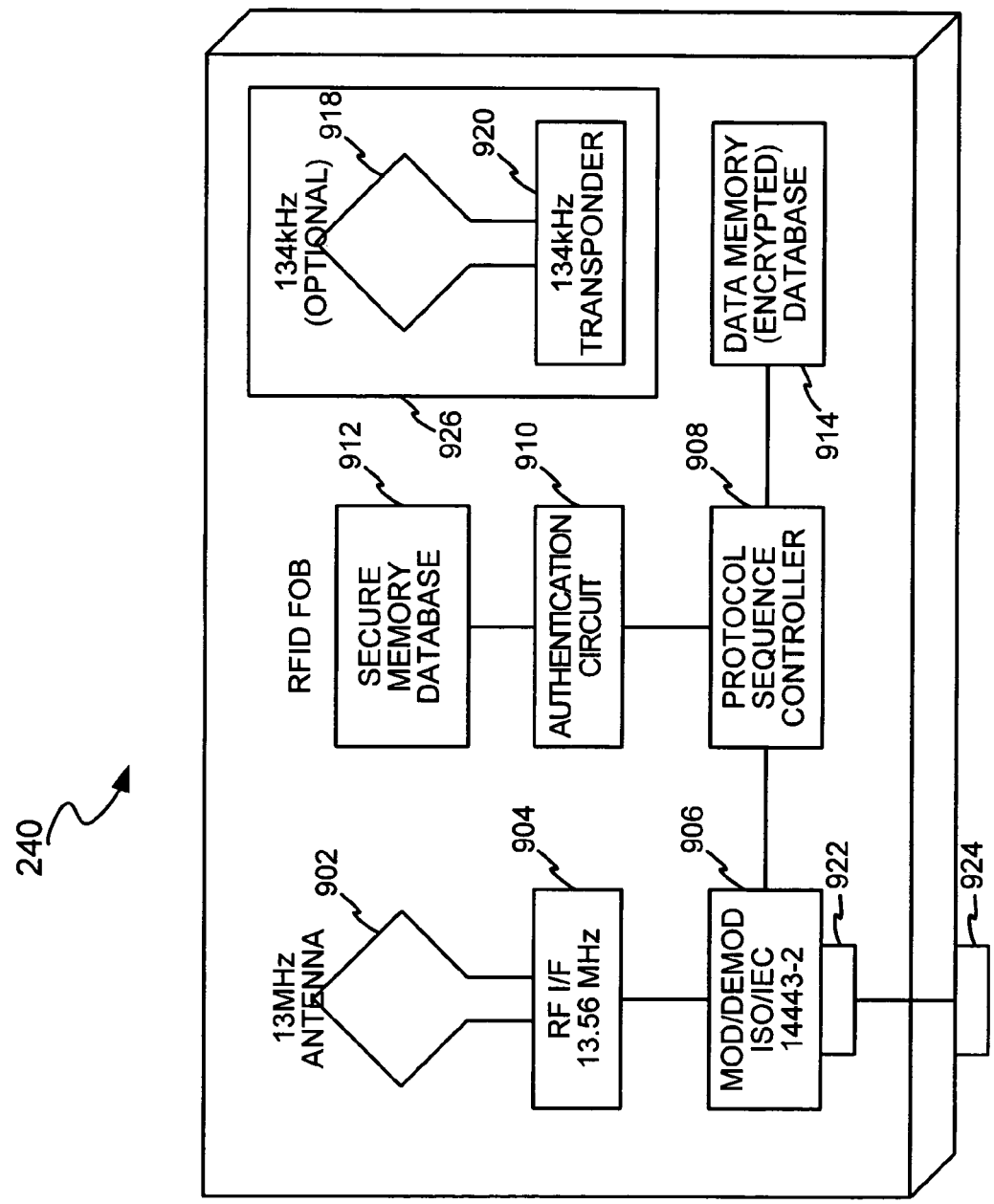
FIG. 9 illustrates a block diagram of exemplary functional block components of an exemplary RFID calling card fob for use in completing a calling card transaction in accordance with exemplary embodiments of the present invention.
Figure 10:
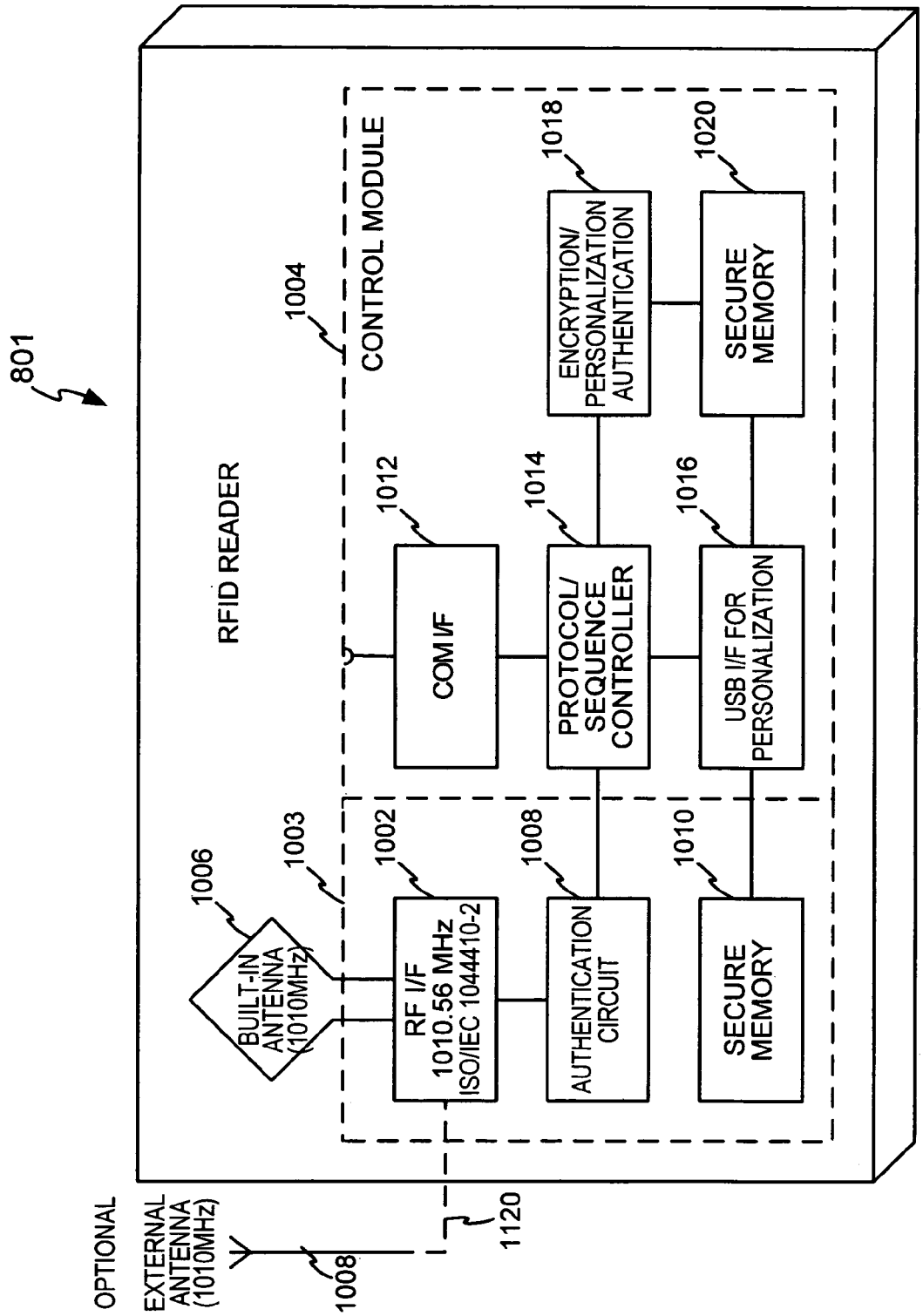
FIG. 10 illustrates a block diagram of exemplary functional block components of an exemplary RFID reader for use in completing a calling card transaction in accordance with exemplary embodiments of the present invention.

Referring to FIGS. 8-10, with continued reference to FIG. 1, an exemplary embodiment of a telecommunications calling card network 800 in which the present invention may be practiced is shown. Particularly, an exemplary telecommunications network 800 may include an host services system 802 configured to sequentially decrementing a validated calling card account during a telephone call, a billing system 820, rating database 830, calling card validation database 840, updating system 850, customer service switch 860, validator 880, inter-exchange network 890, local exchange carrier (LEC) network 895, and a radio frequency identification reader 801 in communication with a telephone call initiating system 843.

The operator services system 802 may comprise a main processor 804: Main processor 804 may facilitate the administration of system-wide control functions. The system-wide control functions may be interconnected, via system data link 805, to switch interface 806. Switch interface 806 serves as an interface between the system and other networks. A dual-tone multi-frequency (DTMF) receiver 810 may be interconnected to processor 804 by data link 803 the DTMF receiver 810 may be responsible for the reception and processing of a caller's dialed input. Card recognition database 812 communicates with processor 804 over data link 809. The database 812 may store a list of calling card vendor identifications. An internal database 814 may be accessed by the processor 804 via data link 811 for obtaining announcement protocols and generating billing data for transmittal to billing system 820. Attendant position 816 may allow a human operator to serve as an interface between a caller and HSS 802, if necessary.

Calling card data is retrieved by the HSS 802 from calling card validation database 840 over signaling link 841, where the calling card validation database may be included in an calling card issue system 230. In an exemplary embodiment, calling card data includes remaining balance information, which may be related to a calling card account number provided to a calling card financial transaction instrument 240 using the methods described herein. In this context, the application tenant may be a calling card number, calling card account number, or the like. The issuer systems 230 may include any number of conventional calling card carriers, such as, AT&T, Cox Communication, Bell South, Qwest, or the like. The calling card carrier issuer system 230 may enroll in the multiple calling card accounts system 200 in accordance with the methods described herein. Further, distinct calling card account numbers may be stored on the transaction instrument 240 in a transaction instrument database as is described above.

Card validation database 840, according to an exemplary embodiment of the invention, may be updated by updating system 850 which accesses the validating database 840 by signaling link 851. Rate information is retrieved from rating database 830 via signaling link 831, and is used by HSS 802 to determine a maximum call duration for calls and the per minute decrement amount required for a particular call. Calling card customers 201 who experience problems with their calling cards may be forwarded to a customer representative posted at attendant position 816 of customer service switch 860 as known in the art. Periodically, calling card issuing companies or issuer systems 240 may add prepaid non-billed balances to a card account to promote calling card use. This promotional balance is entered at the discretion of the card company by the customer representative into customer service switch 860. Customer service switch 860 is interconnected to: HSS 802 via bi-directional trunk 863; inter-exchange carrier network 890 via bi-directional trunk 865; and updating system 850 via signaling link 861. Customer service switch 860 also has access to validator 880 via signaling link 881.

Inter-exchange carrier network 890 receives calling card calls from a switch in a LEC network, such as LEC network 895, over bi-directional trunk 897. Particularly, inter-exchange carrier network 890 is accessed when a caller served by LEC network phone line AAA (or BBB) dials a card company's toll-free access number, such as "1-866-123-4567." Once the call is received in inter-exchange carrier network 890, it is extended over trunk 893 to HSS switch interface 806. Alternatively, the caller may access switch interface 806 directly from. LEC network 895, via trunk 898, by simply dialing "0" plus a directory number.

As such, once one or more calling card numbers is populated onto the transaction instrument 240, the user may seek call completion according to the system 800 and may seek authorization of the call request using any call carrier 230 business as usual standards.

System 800 may include a transaction instrument 240 (shown in FIG. 9) having a transponder 904 and a RFID reader 801 (shown in FIG. 10) in RF communication with transaction instrument 240. The transaction instrument 240 may be called a fob 240 herein. Although the present invention is described with respect to a fob 240, the invention is not to be so limited. Indeed, system 800 may include any fob 240 configured to communicate data for transaction completion. In one exemplary embodiment the fob 240 may be configured to communicate with a RFID reader 801 via RF communication. Typical form factors for the fob 240 may include, for example, a key ring, tag, card, cell phone, wristwatch or any such form capable of being presented for interrogation.

FIG. 9 illustrates a block diagram of the many functional blocks of an exemplary fob 240 in accordance with the present invention. Fob 240 may be a RFID fob 240 which may be presented by the user 201 to facilitate an exchange of funds or points, etc., for receipt of goods or services. As described herein, by way of example, the fob 240 may be a RFID fob which may be presented for facilitating payment for goods and/or services.

Fob 240 may include an antenna 902 for receiving an interrogation signal from RFID reader 801 via antenna 1006 (or alternatively, via external antenna 1008) shown in FIG. 10. Fob antenna 902 may be in communication with a transponder 904. In one exemplary embodiment, transponder 904 may be a 13.56 MHz transponder compliant with the ISO/IEC 14443 standard, and antenna 902 may be of the 13 MHz variety. The transponder 904 may be in communication with a transponder compatible modulator/demodulator 906 configured to receive the signal from transponder 904 and configured to modulate the signal into a format readable by any later connected circuitry. Further, modulator/demodulator 906 may be configured to format (e.g., demodulate) a signal received from the later connected circuitry in a format compatible with transponder 904 for transmitting to RFID reader 801 via antenna 902. For example, where transponder 904 is of the 13.56 MHz variety, modulator/demodulator 906 may be ISO/IEC 14443-2 compliant.

Modulator/demodulator 906 may be coupled to a protocol/sequence controller 908 for facilitating control of the authentication of the signal provided by RFID reader 801, and for facilitating control of the sending of the fob 240 account number. In this regard, protocol/sequence controller 908 may be any suitable digital or logic driven circuitry capable of facilitating determination of the sequence of operation for the fob 240 inner-circuitry. For example, protocol/sequence controller 908 may be configured to determine whether the signal provided by the RFID reader 801 is authenticated, and thereby providing to the RFID reader 801 the account number stored on fob 240.

Protocol/sequence controller 908 may be further in communication with authentication circuitry 910 for facilitating authentication of the signal provided by RFID reader 801. Authentication circuitry may be further in communication with a non-volatile secure memory database 912. Secure memory database 912 may be any suitable elementary file system such as that defined by ISO/IEC 7816-4 or any other elementary file system allowing a lookup of data to be interpreted by the application on the chip. Database 912 may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Databases may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables may be the same. However, data tables having similar, though not identical, data in the key fields may also be merged by using AGREP, for example.

The data may be used by protocol/sequence controller 908 for data analysis and used for management and control purposes, as well as security purposes. Authentication circuitry may authenticate the signal provided by RFID reader 801 by association of the RFID signal to authentication keys stored on database 912. Encryption circuitry may use keys stored on database 912 to perform encryption and/or decryption of signals sent to or from the RFID reader 801.

In addition, protocol/sequence controller 908 may be in communication with a database 914 for storing at least a fob 240 account data, and a unique fob 240 identification code. Protocol/sequence controller 908 may be configured to retrieve the account number from database 914 as desired. Database 914 may be of the same configuration as database 912 described above. The fob account data and/or unique fob identification code stored on database 914 may be encrypted prior to storage. Thus, where protocol/sequence controller 908 retrieves the account data, and or unique fob identification code from database 914, the account number may be encrypted when being provided to RFID reader 801. Further, the data stored on database 914 may include, for example, an unencrypted unique fob 240 identification code, a user identification, Track 1 and 2 data, as well as specific application applets.

Fob 240 may be configured to respond to multiple interrogation frequency transmissions provided by RFID reader 801. That is, RFID reader 801 may provide more than one RF interrogation signal. In this case, fob 240 may be configured to respond to the multiple frequencies by including in fob 240 one or more additional RF signal receiving/transmitting units 926. RF signal receiving/transmitting unit 926 may include an antenna 918 and transponder 920 where the antenna 918 and transponder 920 are compatible with at least one of the additional RF signals provided by RFID reader 801. For example, in one exemplary embodiment, fob 240 may include a 134 KHz antenna 918 configured to communicate with a 134 KHz transponder 920. In this exemplary configuration, an ISO/IEC 14443-2 compliant modulator/demodulator may not be required. Instead, the 134 KHz transponder may be configured to communicate directly with the protocol/sequence controller 908 for transmission and receipt of authentication and account number signals as described above.

FIG. 10 illustrates an exemplary block diagram of a RFID reader 801 in accordance with an exemplary embodiment of the present invention. RFID reader 801 includes, for example, an antenna 1006 coupled to a RF module 1002, which is further coupled to a control module 1004. In addition, RFID reader 801 may include an antenna 1008 positioned remotely from the RFID reader 801 and coupled to RFID reader 801 via a suitable cable 1120, or other wire or wireless connection.

RF module 1002 and antenna 1006 may be suitably configured to facilitate communication with fob 240. Where fob 240 is formatted to receive a signal at a particular RF frequency, RF module 1002 may be configured to provide an interrogation signal at that same frequency. For example, in one exemplary embodiment, fob 240 may be configured to respond to an interrogation signal of about 13.56 MHz. In this case, RFID antenna 1006 may be 13 MHz and may be configured to transmit an interrogation signal of about 13.56 MHz. That is, fob 240 may be configured to include a first and second RF module (e.g., transponder) where the first module may operate using a 134 kHz frequency and the second RF module may operate using a 13.56 MHz frequency. The RFID reader 801 may include two receivers which may operate using the 134 kHz frequency, the 13.56 MHz frequency or both. When the reader 801 is operating at 134 kHz frequency, only operation with the 134 kHz module on the fob 240 may be possible. When the reader 801 is operating at the 13.56 MHz frequency, only operation with the 13.56 MHz module on the fob 240 may be possible. Where the reader 801 supports both a 134 kHz frequency and a 13.56 MHz RF module, the fob 240 may receive both signals from the reader 801. In this case, the fob 240 may be configured to prioritize selection of the one or the other frequency and reject the remaining frequency. Alternatively, the reader 801 may receive signals at both frequencies from the fob upon interrogation. In this case, the reader 801 may be configured to prioritize selection of one or the other frequency and reject the remaining frequency.

Further, protocol/sequence controller 1014 may include an optional feedback function for notifying the user of the status of a particular transaction. For example, the optional feedback may be in the form of an LED, LED screen and/or other visual display which is configured to light up or display a static, scrolling, flashing and/or other message and/or signal to inform the fob 240 user that the transaction is initiated (e.g., fob is being interrogated), the fob is valid (e.g., fob is authenticated), transaction is being processed, (e.g., fob account number is being read by RFID reader) and/or the transaction is accepted or denied (e.g., transaction approved or disapproved). Such an optional feedback may or may not be accompanied by an audible indicator (or may present the audible indicator singly) for informing the fob 240 user of the transaction status. The audible feedback may be a simple tone, multiple tones, musical indicator, and/or voice indicator configured to signify when the fob 240 is being interrogated, the transaction status, or the like.

RFID antenna 1006 may be in communication with a transponder 1002 for transmitting an interrogation signal and receiving at least one of an authentication request signal and/or an account data from fob 240. Transponder 1002 may be of similar description as transponder 114 of FIG. 2. In particular, transponder 1002 may be configured to send and/or receive RF signals in a format compatible with antenna 902 in similar manner as was described with respect to fob transponder 964. For example, where transponder 1006 is 13.56 MHz RF rated antenna 902 may be 13.56 MHz compatible. Similarly, where transponder 1006 is ISO/IEC 14443 rated, antenna 1006 may be ISO/IEC 14443 compatible.

RF module 1002 may include, for example, transponder 1006 in communication with authentication circuitry 1008 which may be in communication with a secure database 1010. Authentication circuitry 1008 and database 1010 may be of similar description and operation as described with respect to authentication circuitry 910 and secure memory database 914 of FIG. 9. For example, database 1010 may store data corresponding to the fob 240 which are authorized to transact business over system 800. Database 1010 may additionally store RFID reader 801 identifying information for providing to fob 240 for use in authenticating whether RFID reader 801 is authorized to be provided the fob account number stored on fob database 914.

Authentication circuitry 1008 may be of similar description and operation as authentication circuitry 910. That is, authentication circuitry 1008 may be configured to authenticate the signal provided by fob 240 in similar manner that authentication circuitry 910 may be configured to authenticate the signal provided by REID reader 801. As is described more fully below, fob 240 and RFID reader 801 engage in mutual authentication. In this context, "mutual authentication" may mean that operation of the system 800 may not take place until fob 240 authenticates the signal from RFID reader 801, and RFID reader 801 authenticates the signal from fob 240.

The RFID reader 801 may be configured to communicate using a RFID internal antenna 806. Alternatively, RFID reader 801 may include an external antenna 808 for communications with fob 240, where the external antenna may be made remote to the RFID reader 801 using a suitable cable and/or data link 821. RFID reader 801 may be further in communication with a telephonic device 843 via a data link 803. A suitable description for a transaction device or fob 240, and a REID reader 801 may be found in U.S. patent Ser. No. 10/192,488, entitled "SYSTEM AND METHOD FOR PAYMENT USING RADIO FREQUENCY IDENTIFICATION IN CONTACT AND CONTACTLESS TRANSACTIONS," filed on Jul. 9, 2002, incorporated herein by reference in its entirety.

Figure 11:
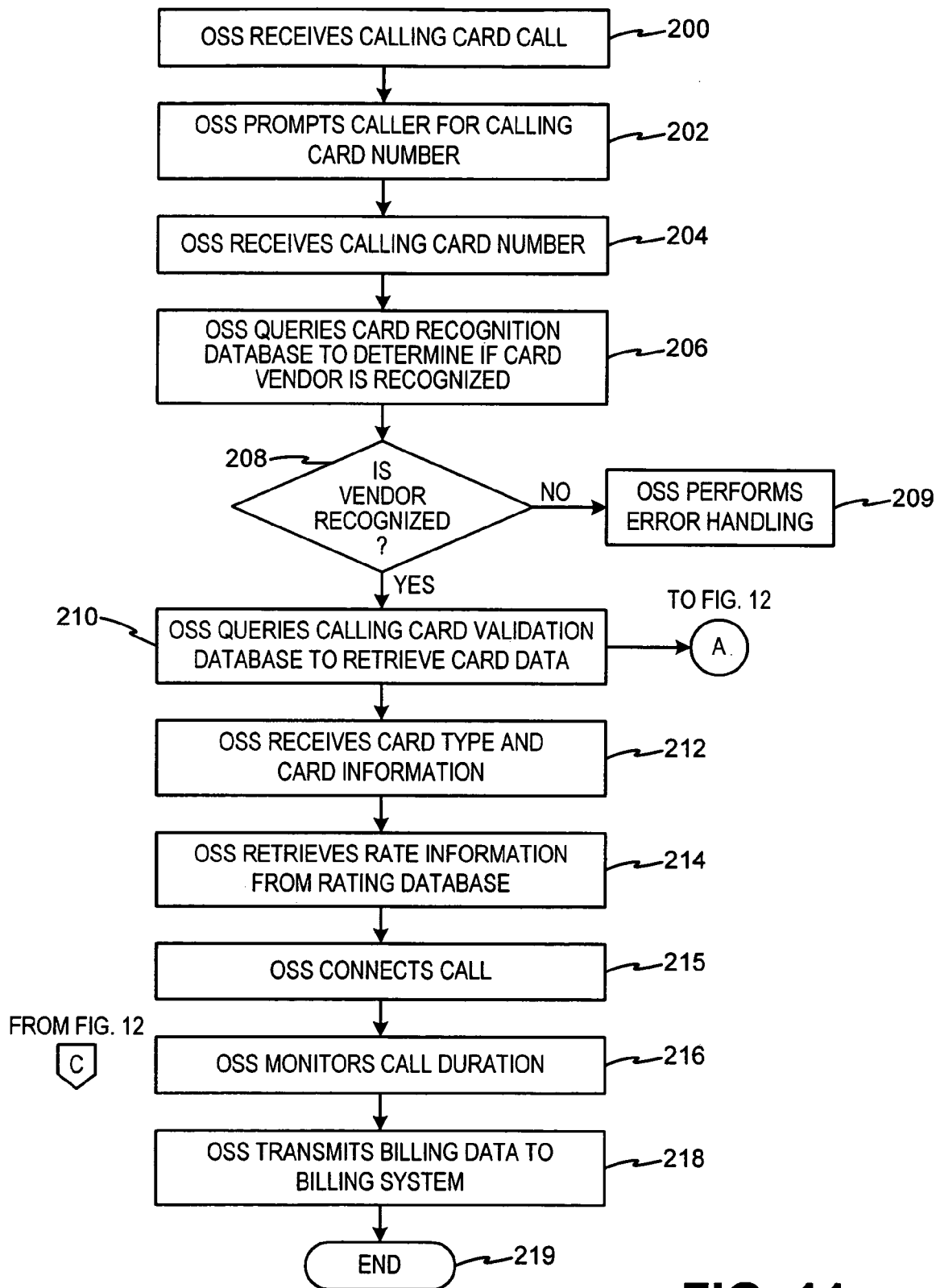
FIGS. 11-13 illustrates an exemplary method for completing a RFID calling card transaction in accordance with exemplary embodiments of the present invention.
Figure 12:
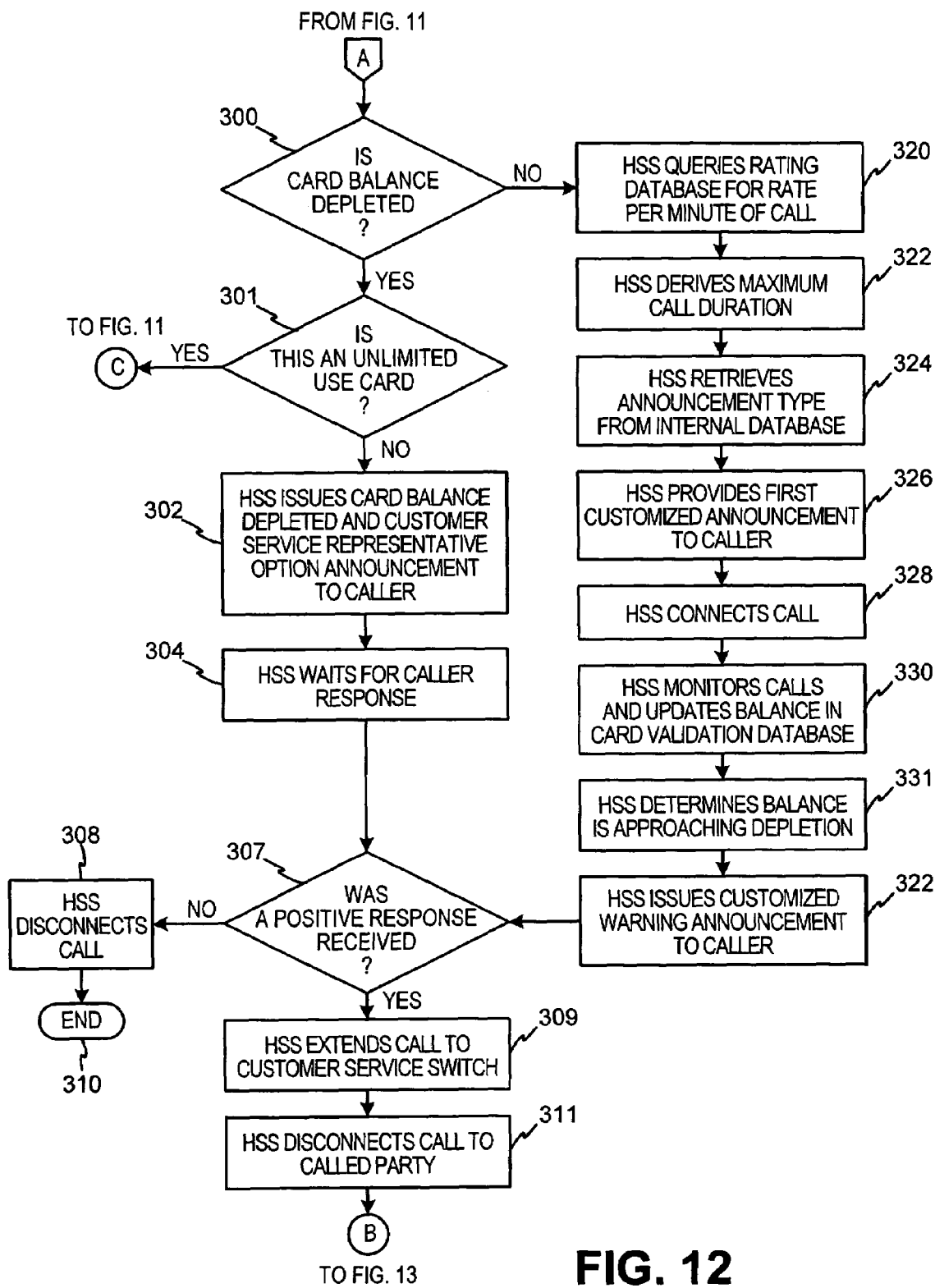
Figure 13:
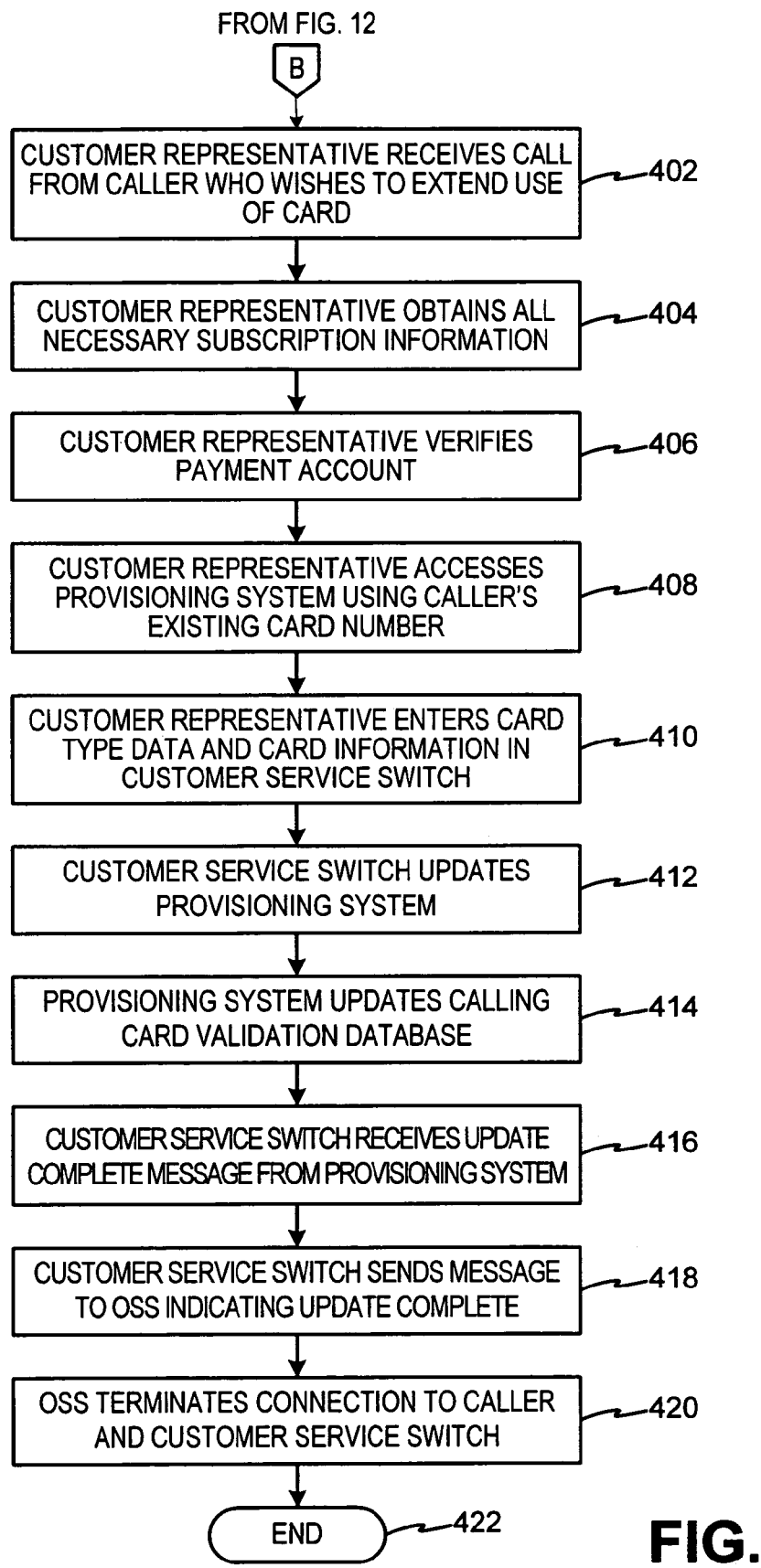

The call handling process begins when a user 201 presents the fob 240 containing the calling card data to a RFID reader 801 by, for example, placing the fob 240 in proximity to the reader 801. The reader 801 may interrogate the fob 240 and receive a calling card account number which may be stored in the fob database 1010. The reader may receive the calling card number and forward the calling card number to the telecommunications device 843 in a device 843 recognizable format. The user 201 may further indicate the destination of his call by inputting a call directory number into a keypad located on the telecommunications device 843. The telecommunications device 843 may then forward the calling card number and the call directory number to the HSS for processing. With reference to FIGS. 11-13, in step 200 HSS switch interface 806 receives the call from either inter-exchange carrier network 890 or LEC network 895. In step 202, HSS 802 prompts the caller for a calling card number by issuing a unique tone or an announcement from announcement database 808. In step 204, HSS 802 receives the calling card number in DTMF receiver 810. Alternatively, if the caller is unable to provide the calling card number by dialing digits within a predetermined time period, a human operator at attendant position 816 is connected to the caller by switch interface 806 so that the calling card number can be retrieved and extended to DTMF receiver 810. The process continues to step 206 in which HSS main processor 804 uses the calling card number it received from DTMF receiver 810 to access calling card recognition database 812. In decision step 208, HSS 802 determines whether the calling card number contains a valid vendor identification (i.e., if the card number corresponds to a recognized vendor) in the database. If the outcome of decision step 208 is a "NO" determination, the process continues to step 209 in which HSS 802 performs error handling, as is known in the art. If the outcome of decision step 208 is a "YES" determination, the process continues to step 210 in which HSS 802 sends a query to calling card validation database 840 over signaling link 841 to request calling card data associated with the card number. In step 212, HSS 802 receives card data, including card product-type data and card information data, from calling card validation database 840. If the card product-type data received from calling card validation database 840 indicates that the card is a permanent or "unlimited use" type card, the process continues to step 214 in which rate information for the call is retrieved from rating database 830. In step 215, the call is connected to the called party at customer line BBB via trunk 896. In step 216, HSS 802 monitors the duration of the call, as is known in the art. In step 218, upon completion of the call, HSS 802 transmits billing data for the call to billing system 820 over data link 803 and processing ends in step 219. In this example, however, the card type data indicates that the card is a promotional card. Therefore, the process continues through connector "A" to FIG. 12.

In decision step 300, HSS 802 determines whether card information data received from validation database 840 indicates that the remaining balance of the promotional card has been depleted (i.e., whether the remaining balance equals $0.00). If the outcome of decision step 300 is a "YES" determination, the process continues to decision step 301 in which determination is made as whether the card is an unlimited use card. For example, this situation would occur if the pre-established non-billed balance had been issued by a calling card company as a promotional "bonus" to a loyal permanent card user, and the card user has depleted the balance. If the outcome of decision step 301 is a "YES" decision, the process returns to step 215. If, however, the outcome of decision step 301 is a "NO" determination, the process continues to step 302 in which HSS 802 issues a message from announcement database 808 which queries the caller to determine whether connection to a customer service representative to arrange for further use of the card is desired. In step 304, HSS 802 waits for a predetermined time period for a response to the query (either a spoken response received at voice recognition facility 813 or, a dialed input received at DTMF facility 810) from the caller. In decision step 307, HSS 802 determines whether a positive response was received from the caller. If the outcome of decision step 307 is a "YES" determination, the process continues to step 309 in which HSS 802 extends the call to customer service switch 860 over trunk 863. In step 311, HSS 802 disconnects the connection to the called party by dropping trunk 896. Further processing continues through connector "B" to FIG. 13, described below. If the outcome of decision step 307 is a "NO" determination, however, the process continues to step 308 in which the call is disconnected by HSS 802 and the process ends in step 310.

In this example, the remaining balance is not $0.00. Therefore, the outcome of decision step 300 is a "NO" determination, and the process continues to step 320 in which. HSS 802 accesses rating database 830, via signaling link 831, to determine the per minute billing rate to apply to this particular call. In step 322, HSS processor 804 uses the billing rate and the remaining balance received from validation database 840 to calculate the maximum duration of the call. In step 324, HSS 802 retrieves the announcement protocol from internal database 814. In this call flow example, the announcement protocol includes: issuing a first announcement which informs the caller of the maximum call duration and balance depletion protocol; and issuing a second warning announcement prior to balance depletion which provides the caller with a customer service representative connection option. In step 326, HSS announcement database 808 issues the first announcement which states the maximum call duration and disconnection information. The process continues to step 328 in which HSS switch interface 806 connects the caller served by line AAA to the called party served by line BBB LEC network 895 via trunk 896. In step 330, HSS 802 continues to monitor the duration of the call, and periodically updates calling card validation database 840 with a new remaining balance as the call continues. In step 332, at some pre-determined remaining balance, (e.g., a remaining balance which allows the call to continue for only 30 seconds) HSS 802 issues the second announcement which states amount of time remaining and instructions for further use of a calling card. In this example, the caller wishes to convert her promotional card into a permanent calling card. Therefore, in response to the query, the caller depresses a particular button on the phone. The process then returns to decision step 307.

FIG. 13 illustrates the steps performed in telecommunications network 800 after HSS 802 has determined that connection to a customer service representative is desired by the caller. In step 400 trunk 896 connection to the called party is dropped and the call is connected to customer service switch 860 via trunk 863. In step 402, a customer service representative receives the call from HSS 802. In step 404, the customer representative answers the call and obtains all necessary information from the caller who wishes to continue to use the calling card number associated with a promotional card. In this case, the caller wants to bill all future charges to her home telephone account corresponding to directory number "602-123-4567". Accordingly, the customer representative obtains from the caller her current calling card number, home directory number and billing address. In step 406, the customer representative verifies the validity of the directory number account by accessing validator 880, as is known in the art.

In step 408, the customer representative accesses updating system 850 via customer service switch 860 using the caller's promotional calling card number. In step 410, the customer representative enters card type data and card information data into customer service switch 860 via attendant position 862. In step 412, customer service switch 860 transmits the new data to updating system 850 via signaling link 851. In step 414, updating system 850 updates calling card validation database 840 via signaling link 851. In step 416, customer services switch 860 receives an "update complete" message from updating system 850. The process continues to step 418 in which customer switch 860 sends a message HSS 802 indicating that the calling card data update is complete. In step 420, HSS 802 releases trunk 863 to customer service switch 860 and releases trunk connection 895 to the caller. The process ends in step 422.

FIG. 14 shows a representation of data stored in calling card validation database 840 with respect to three distinct calling cards. As shown in FIG. 14, calling card number "1" is card product-type "A". Accordingly, information stored for this particular calling card account requires remaining balance data which, in this case, is $0.00 as well as balance depletion protocol data which requires all calls made using calling card number "1" to be billed to an account associated with directory number "708-555-1234". Calling card number "2" relates to card product-type "B" which requires remaining balance and balance depletion protocol data. Calling card number "2" has a remaining balance of $5.00 which indicates that the user of this card may continue to place calls. Unlike calling card number "1", however, the balance depletion protocol associated with this particular calling card is to disconnect all calls upon depletion of the remaining balance. Calling card number "3" is a "C" product-type card. The card information data indicates that all calls made using calling card number "3" should be billed to an account associated with directory number "708-555-6457". There is no pre-established non-billed balance associated with calling card number "3". A complete understanding of the operation of a conventional telephone calling card system in accordance with the present invention may be found in U.S. Pat. No. 5,864,609, issued Jan. 26, 1999, to Cross, et al., which is herein incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. It should be noted that many alternative or additional functional relationships or physical connections may be present in a practical data set management system.

As may be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium Any suitable computer-readable storage medium may be utilized, including hard disks, CD-ROM, optical storage devices, magnetic storage devices, and/or the like.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus include steps for implementing the functions specified in the flowchart block or blocks.

In the foregoing specification, the invention has been described with reference to specific embodiments. However, it may be appreciated that various modifications and changes can be made without departing from the scope of the present invention. For example, the issuer may reserve all management of data stored on the transaction device, thereby prohibiting the user from modifying the issuer-owned data thereon. Further, each issuer system may have its own data management protocol, which necessarily does not interfere with or depend upon the data management protocol of other issuer systems. As such, the specification and figures are to be regarded in an illustrative manner applicable irrespective of the data processing protocol used by a data set owner, rather than a restrictive one, and all such modifications are intended to be included within the scope of the present invention. Accordingly, the scope of the invention should be determined by the appended and their legal equivalents, rather than by the examples given above. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A method for facilitating a transaction using a plurality of calling card issuer owned data sets on a transaction instrument, the method comprising the steps of:

facilitating enrollment of a first call carrier data set owner and a second call carrier data set owner into a RF transaction instrument program;

facilitating adding to a database, a first calling card data set of a first format at the transaction instrument, wherein said first calling card data set is owned by said first call carrier data set owner;

facilitating adding to a database, a second calling card data set of a second format at the transaction instrument, wherein said second calling card data set is owned by said second call carrier set owner, wherein said first owner is distinct from said second owner, and said first format is different from said second format, wherein said first calling card data set is stored in accordance with said first format, and said second calling card data set is stored in accordance with said second format;

adding a header to at least one of said first and second calling card data sets, the header identifying at least a status condition of the at least one of said first and second calling card data sets, wherein the status condition indicates an action to be taken relative to the respective calling card data set; and wherein said transaction instrument is operable to complete a calling card call in accordance with at least one of said first and second format.

2. A method of claim 1, further including the step of providing at least one of said first and second calling card data sets is formatted to communicate with a RFID reader via RF communications.

3. A method of claim 2, wherein said RFID reader is operable to receive at least one of said first and second calling card data sets in magnetic stripe format.

4. The method of claim 3, wherein said at least one of said first and second calling card data sets is in magnetic stripe format.

5. The method of claim 3, further comprising:

providing a remotely stored calling card account associated with at least one of said first and second calling card data sets, wherein said calling card account includes a value associated with transaction account usage; and depleting the remotely stored calling card transaction account value based on one or more calling card calls.

6. A system for a transaction device for storing multiple calling card accounts numbers distinctly stored on a RF operable transaction instrument, said RF transaction instrument comprising at least a first data storage area configured to store a first calling card number data set in a first format and a second data storage area configured to store a second calling card number data set in a second format different from said first format, wherein said first calling card number data set is associated with a first owner and said first data storage area is configured to store said first calling card number in said first format independent of said second calling card number data set;

wherein at least one of said first calling card number data set and said second calling card number data set includes a header, the header identifying at least a status condition of the at least one of said first and second calling card number data sets and the status condition indicating an action to be taken relative to the respective calling card number data set;

wherein said RF transaction instrument is operable to complete a calling card call in accordance with at least one of said first and second format.

7. system according to claim 6, further including a remote calling card validation database for authorizing calling card account transactions, said validation database in communication with a rating database for use in determining cost associated with completing a calling card transaction request.

* * * * *

UNITED STATES PATENT AND TRADEMARK OFFICE
CERTIFICATE OF CORRECTION

| | | |
|---|---|---|
| PATENT NO. | : 7,463,133 B2 | |
| APPLICATION NO. | : 10/810469 | |
| DATED | : December 9, 2008 | |
| INVENTOR(S) | : David S. Bonalle et al. | |

It is certified that error appears in the above-identified patent and that said Letters Patent is hereby corrected as shown below:

Title Page, item [56] REFERENCES CITED:

U.S. Patent Documents
"4,639,765 A 1/1987 dHont" should read --4,639,765 A 1/1987 D'Hont--.
"5,247,304 A 9/1993 dHont" should read --5,247,304 A 9/1993 D'Hont--.
"5,274,392 A 12/1993 dHont" should read --5,274,392 A 12/1993 D'Hont--.
"5,351,052 A 9/1994 dHont" should read --5,351,052 A 9/1994 D'Hont--.
"5,373,303 A 12/1994 dHont" should read --5,373,303 A 12/1994 D'Hont--.
"5,408,243 A 4/1995 dHont" should read --5,408,243 A 4/1995 D'Hont--.
"5,428,363 A 6/1995 dHont" should read --5,428,363 A 6/1995 D'Hont--.
"5,453,747 A 9/1995 dHont" should read --5,453,747 A 9/1995 D'Hont--.
"5,491,483 A 2/1996 dHont" should read --5,491,483 A 2/1996 D'Hont--.
"5,497,121 A 3/1996 dHont" should read --5,497,121 A 3/1996 D'Hont--.
"5,557,279 A 9/1996 dHont" should read --5,557,279 A 9/1996 D'Hont--.
"5,563,582 A 10/1996 dHont" should read --5,563,582 A 10/1996 D'Hont--.
"5,592,150 A 1/1997 dHont" should read --5,592,150 A 1/1997 D'Hont--.
"5,594,448 A 1/1997 dHont" should read --5,594,448 A 1/1997 D'Hont--.
"5,619,207 A 4/1997 dHont" should read --5,619,207 A 4/1997 D'Hont--.
"5,625,366 A 4/1997 dHont" should read --5,625,366 A 4/1997 D'Hont--.
"5,625,370 A 4/1997 dHont" should read --5,625,370 A 4/1997 D'Hont--.
"5,625,695 A 4/1997 MRaihi" should read --5,625,695 A 4/1997 M'Raihi--.
"5,732,579 A 3/1998 dHont" should read --5,732,579 A 3/1998 D'Hont--.
"5,748,137 A 5/1998 dHont" should read --5,748,137 A 5/1998 D'Hont--.
"5,867,100 A 2/1999 dHont" should read --5,867,100 A 2/1999 D'Hont--.
"5,870,915 A 2/1999 dHont" should read --5,870,915 A 2/1999 D'Hont--.
"5,955,969 A 9/1999 dHont" should read --5,955,969 A 9/1999 D'Hont--.
"6,064,320 A 5/2000 dHont" should read --6,064,320 A 5/2000 D'Hont--.
"6,226,382 B1 5/2001 MRaihi" should read --6,226,382 B1 5/2001 M'Raihi--.

[56] REFERENCES CITED:

U.S. Patent Documents
"2003/0025600 A1 2/2003 Blachard" should read --2003/0025600 A1 2/2003 Blanchard--.
"2003/0225716 A1 12/2003 Atkinson et al." should read --2003/0225716 A1 12/2003 Atkinson et al.--.

UNITED STATES PATENT AND TRADEMARK OFFICE
CERTIFICATE OF CORRECTION

| | |
|---|---|
| PATENT NO. | : 7,463,133 B2 |
| APPLICATION NO. | : 10/810469 |
| DATED | : December 9, 2008 |
| INVENTOR(S) | : David S. Bonalle et al. |

It is certified that error appears in the above-identified patent and that said Letters Patent is hereby corrected as shown below:

[56] REFERENCES CITED:

Foreign Patent Documents
"EP 0358525 3/1990" should be deleted.
"EP 1016947 7/2000" should be deleted.
"GB 2347537 9/2000" should be deleted.
"JP 2000-11109 A 1/2000" should be deleted.
"JP 2000015288 A 1/2000" should read --JP 2000-015288 A 1/2000--.
"JP 2000-40181 A 2/2000" should be deleted.
"JP 2000067312 A 3/2000" should read --JP 2000-067312 A 3/2000--.
"JP 2000207641 A 7/2000" should read --JP 2000-207641 A 7/2000--.
"JP 2001-5931 A 1/2001" should be deleted.
"JP 2001283122 A 10/2001" should read --JP 2001-283122 A 10/2001--.
"WO 95/32919 12/1995" should be deleted.
"WO 99/03057 A1 1/1999" should be deleted.
"WO 00/10144 A1 2/2000" should be deleted.
"WO 00/38088 A1 6/2000" should be deleted.
"WO 01/04825 A1 1/2001" should be deleted.
"WO 01/15098 A1 3/2001" should be deleted.
"WO 01/43095 A2 6/2001" should be deleted.
"WO 01/72224 A1 10/2001" should be deleted.
"WO 01/77856 A1 10/2001" should be deleted.

[56] REFERENCES CITED:

Foreign Patent Documents
"WO 01/80473 A2 10/2001" should be deleted.
"WO 01/90962 A1 11/2001" should be deleted.
"WO 01/95243 A2 12/2001" should be deleted.
"WO 02/01485 A1 1/2002" should be deleted.
"WO 02/13134 A2 2/2002" should be deleted.
"WO 02/063545 A2 8/2002" should be deleted.
"WO 02/065246 A2 8/2002" should be deleted.
"WO 02/065404 A2 8/2002" should be deleted.
"WO 02/069221 A1 9/2002" should be deleted.
"WO 02/073512 A1 9/2002" should be deleted.
"WO 02/086665 A2 10/2002" should be deleted.
"WO 02/091281 A2 11/2002" should be deleted.
"WO02/097575 A2 12/2002" should be deleted.
"WO 02/101670 A2 12/2002" should be deleted.

UNITED STATES PATENT AND TRADEMARK OFFICE
CERTIFICATE OF CORRECTION

PATENT NO. : 7,463,133 B2
APPLICATION NO. : 10/810469
DATED : December 9, 2008
INVENTOR(S) : David S. Bonalle et al.

It is certified that error appears in the above-identified patent and that said Letters Patent is hereby corrected as shown below:

[56] REFERENCES CITED:

Other Publications
"BobBrewin" should read --Bob Brewin--.
"Mobile Speedpass" should read --Mobil Speedpass--.
"Spot Technology" should read --SPOT Technology--.
"Microsft" should read --Microsoft--.
"See Spot Run" should read --See SPOT Run--.
"Microsoft Spot" should read --Microsoft SPOT"--.
"RFID Journnal." should read --RFID Journal,--.

[56] REFERENCES CITED:

Other Publications
"card the uses" should read --card that uses--.
"to able" should read --to be able--.
Physical Reality: A Second Look", Ken Sharp, Senior Technical Editor, http://www.idsystem.com/reader/1999_03/phys0399_pt2/phys0399_pt2.htm. "'Magic Wands' to Speed Mobile Sales", Bob Brewin, Jan. 15, 2001, http://www.computerworld.com/mobiletopics/mobile/story/1,10801,563300.html. Functional Specification, Standard Card IC MF1 1C S. 50, Philips Semiconductors, Product Specification Rev. 5.1 May 2001." should be deleted.
"FTC Suite Against" should read --FTC Suit Against--.
"The Institution of Electrical Engineers," should read --The Institute of Electrical and Electronics engineers (IEEE),--.

Title Page, item [74] ATTORNEY:

Attorney, "Fitpatrick, Cella, Harper & Scinto" should read --Fitzpatrick, Cella, Harper & Scinto--.

SHEET 1

Figure 1, "Modity" should read --Modify--.

SHEET 4

Figure 4, "Creat" should read --Create--.

UNITED STATES PATENT AND TRADEMARK OFFICE
CERTIFICATE OF CORRECTION

PATENT NO. : 7,463,133 B2
APPLICATION NO. : 10/810469
DATED : December 9, 2008
INVENTOR(S) : David S. Bonalle et al.

It is certified that error appears in the above-identified patent and that said Letters Patent is hereby corrected as shown below:

COLUMN 2

Line 14, "stolen preventing" should read --stolen, preventing--.

COLUMN 3

Line 67, "system" should read --system.--.

COLUMN 6

Line 27, "links. For" should read --links: for--.

COLUMN 8

Line 5, "instrument" should read --instruments--; and
Line 39, "Bishop,.et. al.," should read --Bishop et al.,--.

COLUMN 9

Line 14, "type and etc." should read --type, etc.--; and
Line 31, "instrument," should read --instrument--.

COLUMN 10

Line 13, "DB2by" should read --DB2 by--; and
Line 47, "software;" should read --software,--.

COLUMN 11

Line 65, "where" should be deleted.

COLUMN 12

Line 43, "stand-alone" should read --stand-alone device--.

COLUMN 13

Line 21, "stand-alone" should read --stand-alone device--;
Line 29, "merchant" (first occurrence) should read --the merchant--; and
Line 51, "indicting" should read --indicating--.

UNITED STATES PATENT AND TRADEMARK OFFICE
CERTIFICATE OF CORRECTION

| | | |
|---|---|---|
| PATENT NO. | : 7,463,133 B2 | |
| APPLICATION NO. | : 10/810469 | |
| DATED | : December 9, 2008 | |
| INVENTOR(S) | : David S. Bonalle et al. | |

It is certified that error appears in the above-identified patent and that said Letters Patent is hereby corrected as shown below:

COLUMN 14

Line 37, "provide the to a" should read --provide the data to a--.

COLUMN 15

Line 10, "stand-alone" should read --stand-alone device--;
    Line 48, "indicates" should read --and indicates--; and
    Line 51, "indicting" should read --indicating--.

COLUMN 16

Line 19, "system. 220," should read --system 220,--.

COLUMN 17

Line 57, "a issuer" should read --an issuer--.

COLUMN 18

Line 36, "data sets in similar" should read --data sets proceeds in a similar--; and
    Line 60, "interaction" should read --and interaction--.

COLUMN 19

Line 16, "issuer-owning" should read --issuer owning--; and
    Line 55, "system. 230." should read --system 230.--.

COLUMN 20

Line 5, "DB2by" should read --DB2 by--;
    Line 29, "invention," should read --the invention,--;
    Line 33, "sets to-the" should read --sets to the--; and
    Line 47, "device" (first occurrence) should be deleted.

COLUMN 21

Line 31, "the steps of loading" should read --the steps of: loading--.

UNITED STATES PATENT AND TRADEMARK OFFICE
CERTIFICATE OF CORRECTION

PATENT NO. : 7,463,133 B2
APPLICATION NO. : 10/810469
DATED : December 9, 2008
INVENTOR(S) : David S. Bonalle et al.

It is certified that error appears in the above-identified patent and that said Letters Patent is hereby corrected as shown below:

COLUMN 22

Line 61, "the like: for" should read --the like. For--.

COLUMN 24

Line 27, "system 230. (step" should read --system 230 (step--;
    Line 31, "to the inter-" should be deleted;
    Line 32, "action device 290" should be deleted; and
    Line 45, "may the present" should read --may present--.

COLUMN 26

Line 15, "processor 804: Main" should read --processor 804. Main--; and
    Line 21, "ink 803 the" should read --ink 803. The--.

COLUMN 27

Line 13, "from. LEC" should read --from LEC--.

COLUMN 28

Line 56, "and or unique" should read --and/or unique--.

COLUMN 30

Line 12, "rated antenna" should read --rated, antenna--;
    Line 22, "transact-" should read --transact--;
    Line 33, "REID reader" should read --RFID reader--; and
    Line 48, "REID reader" should read --RFID reader--.

COLUMN 31

Line 46, "as whether" should read --as to whether--.

COLUMN 32

Line 7, "which. HSS" should read --which HSS--; and
    Line 66, "message HSS" should read --message to HSS--.

UNITED STATES PATENT AND TRADEMARK OFFICE
CERTIFICATE OF CORRECTION

PATENT NO. : 7,463,133 B2
APPLICATION NO. : 10/810469
DATED : December 9, 2008
INVENTOR(S) : David S. Bonalle et al.

It is certified that error appears in the above-identified patent and that said Letters Patent is hereby corrected as shown below:

COLUMN 33

Line 51, "medium Any" should read --medium. Any--.

COLUMN 34

Line 20, "appended and" should read --appended claims and--;
Line 53, "carrier set" should read --carrier data set--; and
Line 67, "format." should read --formats.--.

COLUMN 35

Line 23, "comprising" should read --comprising:--.

COLUMN 36

Line 15, "set;" should read --set; and--;
Line 18, "format." should read --formats.--; and
Line 19, "7. system" should read --7. A system--.

Signed and Sealed this

First Day of December, 2009

David J. Kappos
*Director of the United States Patent and Trademark Office*